(12) United States Patent
Russell

(10) Patent No.: US 8,113,165 B2
(45) Date of Patent: Feb. 14, 2012

(54) STATIONARY BLOCK ROTARY ENGINE/GENERATOR

(75) Inventor: Robert L. Russell, Frankfort, IL (US)

(73) Assignee: Russell Energy Corporation, Frankfort, IL (US)

( * ) Notice: Subject to any disclaimer, the term of this patent is extended or adjusted under 35 U.S.C. 154(b) by 602 days.

(21) Appl. No.: 12/371,677

(22) Filed: Feb. 16, 2009

(65) Prior Publication Data

US 2010/0139600 A1    Jun. 10, 2010

(51) Int. Cl.
*F02P 1/00* (2006.01)
*F02B 63/04* (2006.01)
*H02K 11/00* (2006.01)
*H02K 21/10* (2006.01)

(52) U.S. Cl. ...... 123/149 A; 123/2; 123/56.7; 310/67 R; 290/1 A

(58) Field of Classification Search ............. 123/2, 56.2, 123/56.7, 149 R, 149 A; 310/67 R, 75 R, 310/156.11; 290/1 R, 1 A
See application file for complete search history.

(56) References Cited

U.S. PATENT DOCUMENTS

| | | |
|---|---|---|
| 1,252,757 A | 1/1918 | Williams |
| 1,485,988 A | 4/1924 | Michel |
| 1,533,514 A | 4/1925 | Ragot |
| 2,371,005 A | 3/1945 | Wagers |
| 2,558,349 A | 6/1951 | Fette |
| 2,988,065 A | 6/1961 | Wankel et al. |
| 3,762,377 A | 10/1973 | Anthony et al. |
| 3,893,430 A | 7/1975 | Burley |
| 3,952,708 A | 4/1976 | Burley |
| 3,964,450 A | 6/1976 | Lockshaw |
| 3,987,758 A | 10/1976 | Wankel |
| 4,095,564 A | 6/1978 | Hochstein |
| 4,334,506 A | 6/1982 | Albert |
| 4,653,438 A | 3/1987 | Russell |
| 5,329,768 A * | 7/1994 | Moscrip ......................... 60/518 |
| 5,636,599 A | 6/1997 | Russell |
| 5,701,930 A | 12/1997 | Russell |

(Continued)

FOREIGN PATENT DOCUMENTS

AU    2001246251 B2    11/2005

(Continued)

OTHER PUBLICATIONS

International Search Report: PCT/US2009/006727.

*Primary Examiner* — Willis Wolfe, Jr.
(74) *Attorney, Agent, or Firm* — Ladas & Parry LLP

(57) ABSTRACT

An internal combustion engine, and integrated electrical generator, both enclosed in a single housing. The engine has at least one cylinder and piston which extends radially from an axis of rotation about which a combination cam plate and generator armature assembly rotates to produce electrical energy as it passes a stationary electrical coil secured within the housing. The engine block, including at least one cylinder, remains stationary.

25 Claims, 14 Drawing Sheets

U.S. PATENT DOCUMENTS

| | | |
|---|---|---|
| 6,167,850 B1 | 1/2001 | Blount |
| 6,230,670 B1 | 5/2001 | Russell |
| 6,240,884 B1 | 6/2001 | Lillbacka |
| 6,457,443 B1 | 10/2002 | Lillbacka |
| 6,539,913 B1 | 4/2003 | Gardiner |
| 6,883,473 B2 | 4/2005 | Wondergem |
| 7,281,513 B1 | 10/2007 | Webb |
| 7,331,315 B2 | 2/2008 | Mavinahally |
| 7,451,726 B1 | 11/2008 | Sporea |
| 2002/0023597 A1 | 2/2002 | Lillbacka |
| 2006/0243230 A1 | 11/2006 | Mavinahally |
| 2006/0250043 A1 * | 11/2006 | Chung .................. 310/216 |
| 2009/0250020 A1 * | 10/2009 | McKaig et al. ......... 123/56.2 |
| 2009/0314238 A1 | 12/2009 | Russell |

FOREIGN PATENT DOCUMENTS

| | | |
|---|---|---|
| DE | 372 808 C | 4/1923 |
| DE | 10126176 A1 * | 12/2002 |
| FR | 436 702 A | 4/1911 |
| WO | 02/079625 A1 | 10/2002 |
| WO | 2010/012731 A2 | 2/2010 |

* cited by examiner

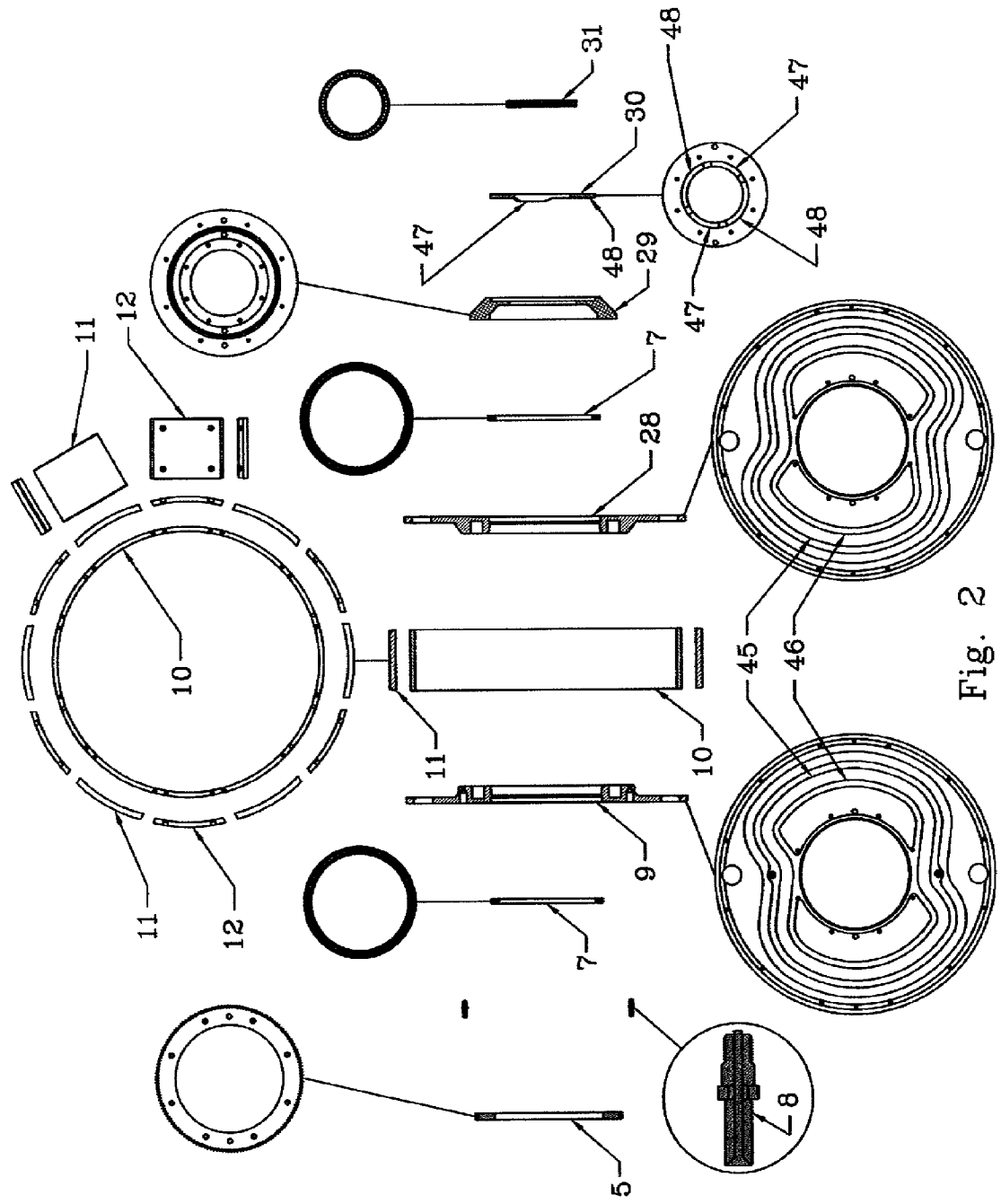

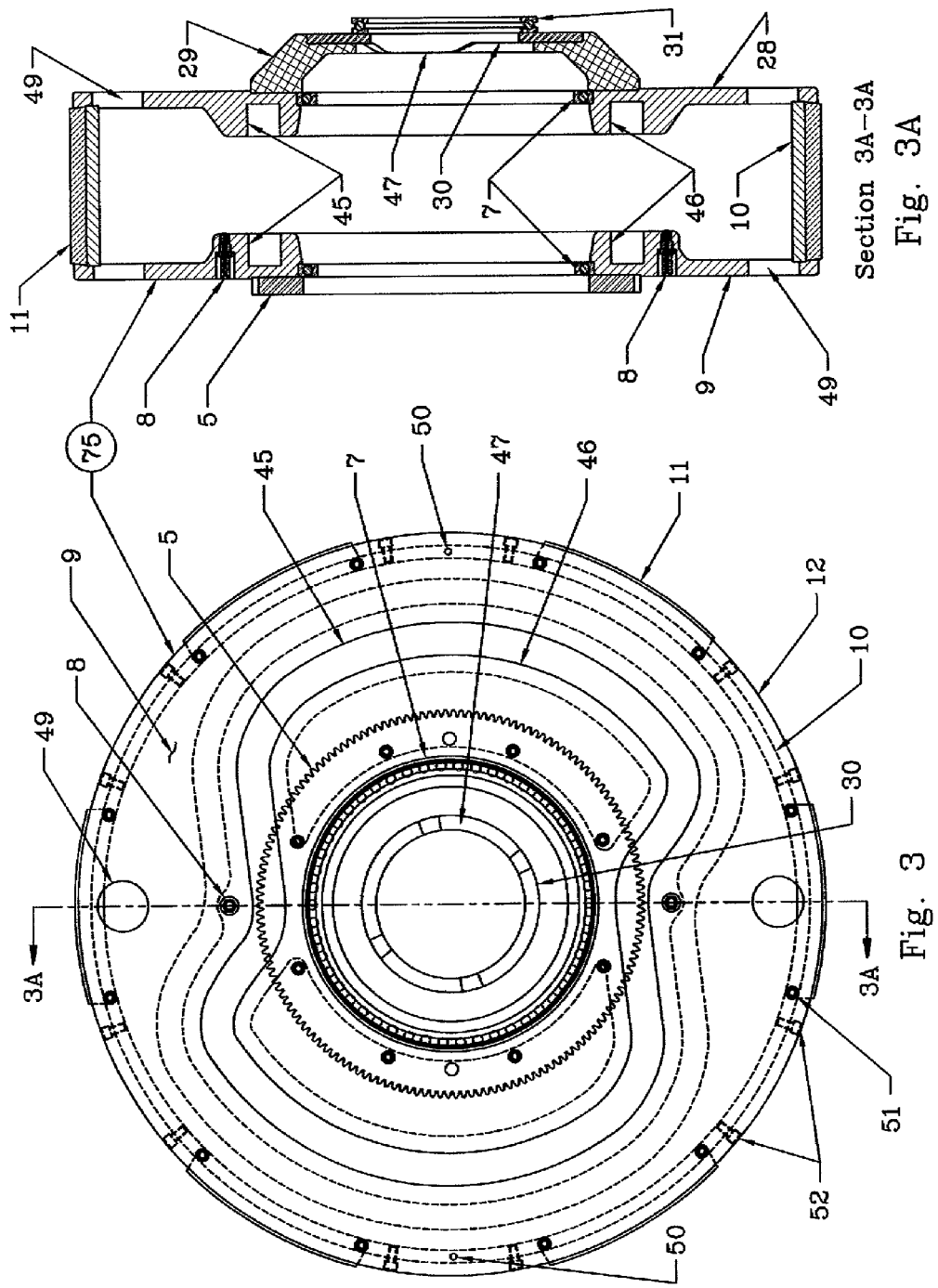

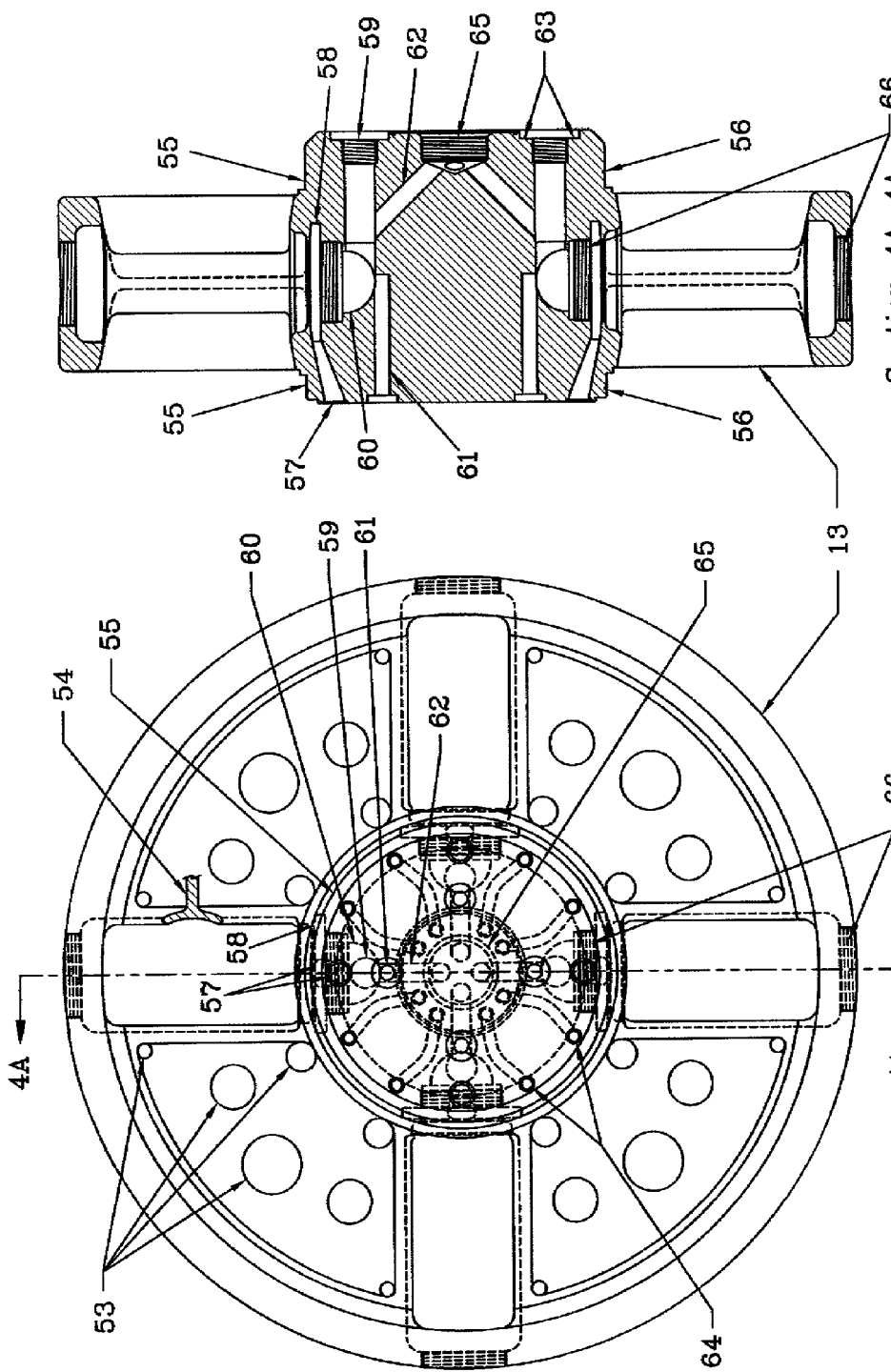

Section 4A-4A

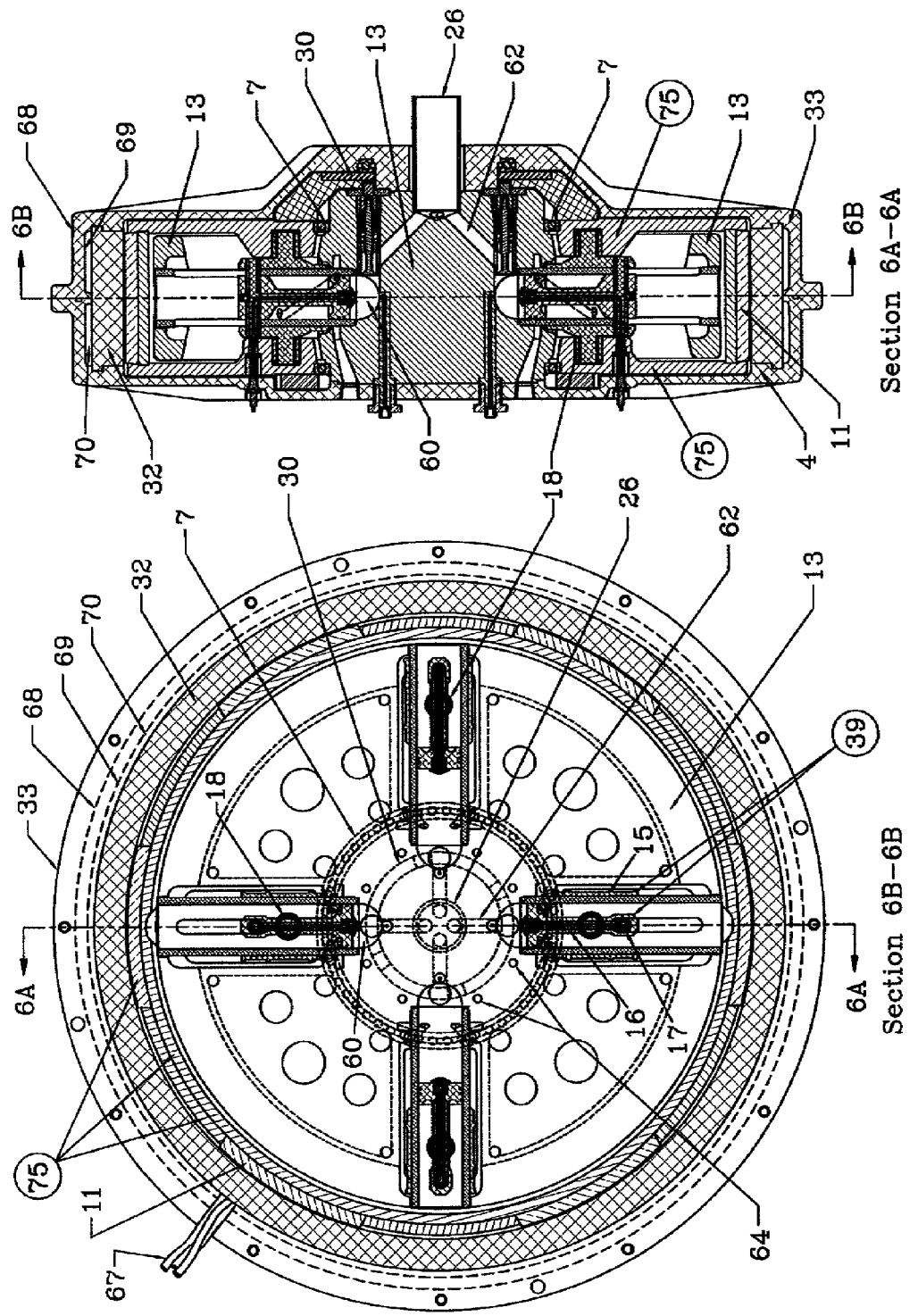

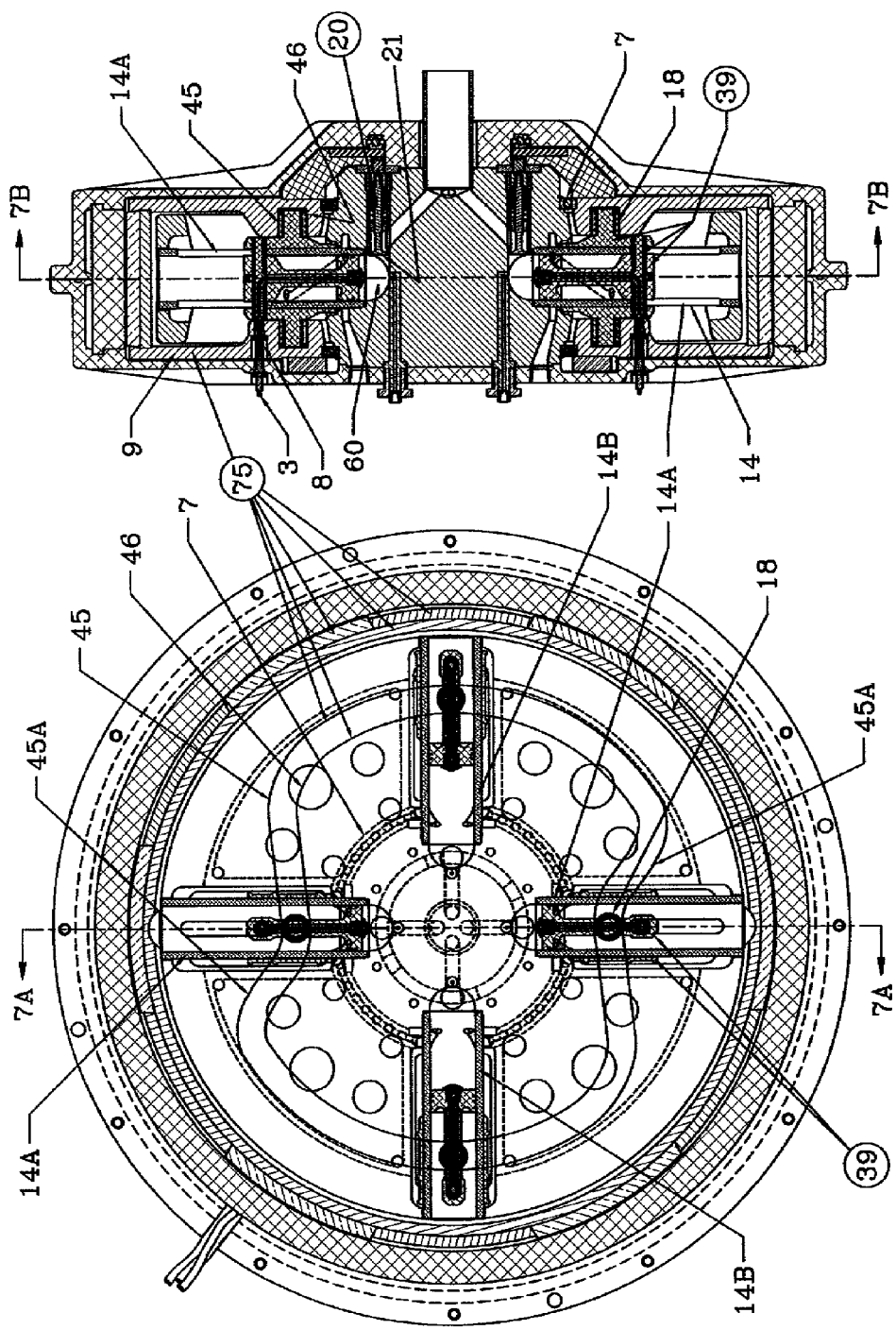

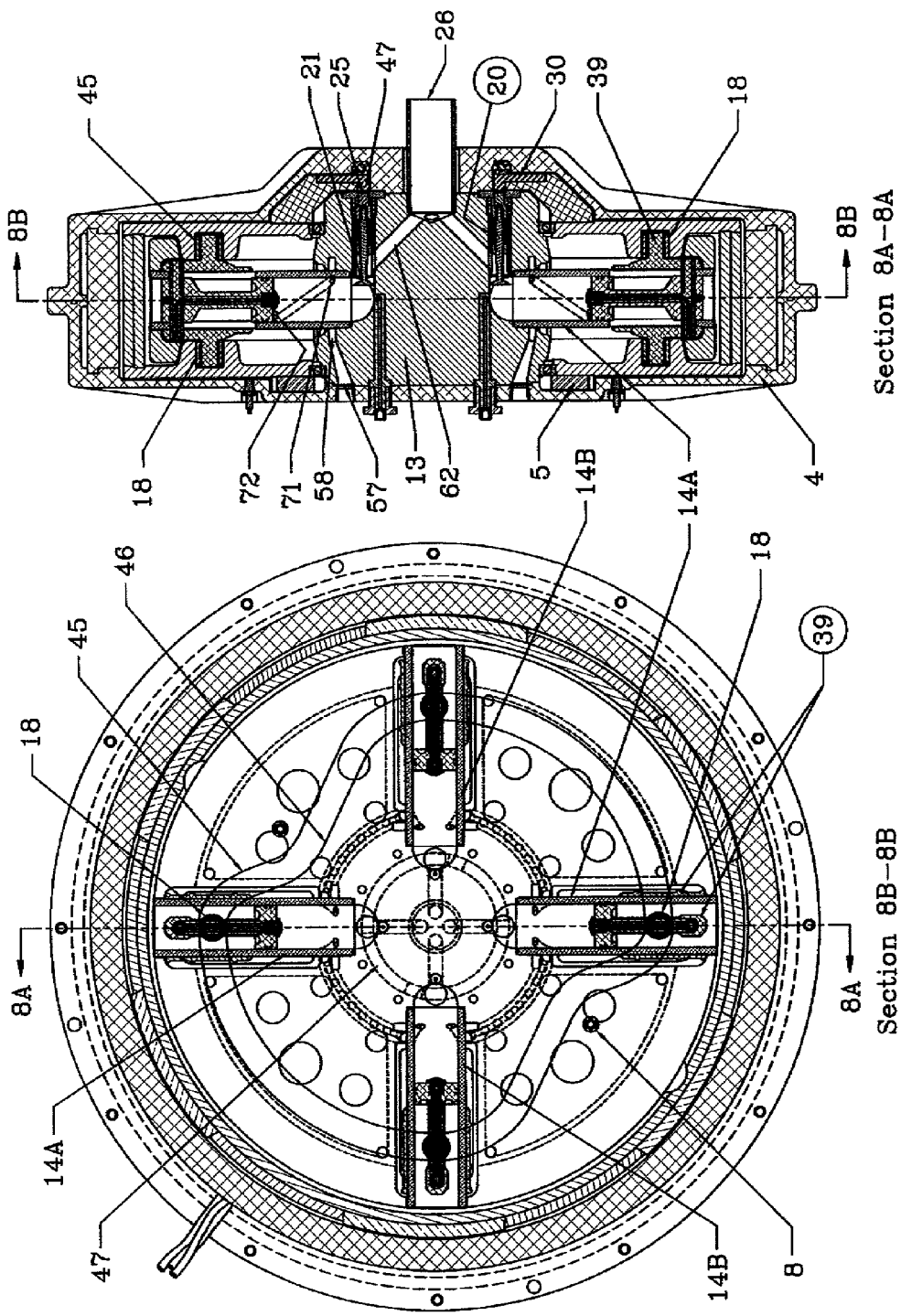

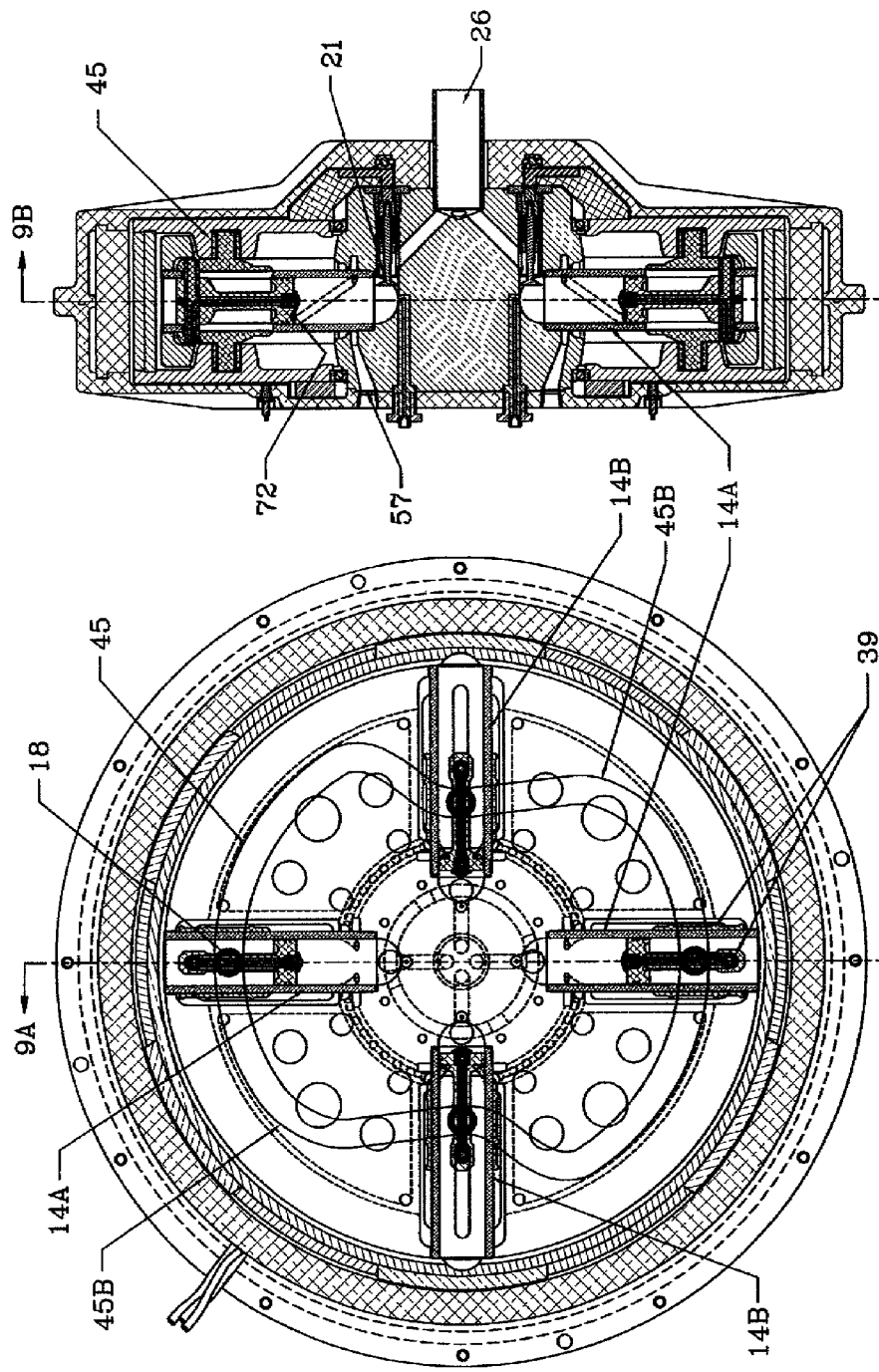

STATIONARY BLOCK ROTARY ENGINE/GENERATOR

This invention relates to an engine and generator, and more particularly to improvements in mechanical internal combustion engines, and electrical generator combinations for producing electrical energy. The invention also relates to a method of utilizing the engine and generator to produce mechanical and electrical power.

BACKGROUND OF THE INVENTION

In these times of ever increasing global demands for all liquid and gaseous fuels, increased concern regarding the use and supply of fossil fuels, and the constantly growing demand for electrical energy, it is clear that there is a need for a better, cleaner, more efficient method of using those fuels and producing electrical energy for both stationary as well as for portable energy needs. Although there is currently a great emphasis on the development of cleaner, environmentally friendly systems for producing electrical energy through methods such as solar, wind and wave, they are not always practical especially in portable applications. These cleaner technologies often lack the dependability necessary in electrical supply applications. It is not always sunny or windy, and the bodies of water large enough to produce usable wave power are not always wavy. There will always be a need for dependable and efficient, turn key, methods of outputting mechanical power and/or producing the electrical energy that we need to survive and grow. A goal is to develop the best, most cost effective method possible of utilizing fossil or synthetic fuels while producing electrical energy efficiently.

The "Stationary Block Rotary Engine/Generator" of the present invention represents a great improvement in the ability to convert energy from fuel into either mechanical output power or clean electrical energy. The present invention is a markedly smaller, lighter, and more power dense power output system. The present invention is also more energy efficient, environmentally friendly, durable and dependable than conventional engine and generator combinations, and it is far more affordable to produce and operate than conventional engine driven generators. This technology is particularly advantageous in larger applications as the benefits of size, weight, power density and efficiency increase with larger outputs. More importantly, this technology offers an immediate and positive step forward in the goal to conserve the world's energy resources.

The present invention seeks to meet the aforenoted demands and needs for an environmentally friendly, conservation minded, energy efficient mechanical power output and electric generating device that is smaller, lighter, more power dense, more durable, dependable and more affordable by providing a unique rotary engine design combined with an optional integrated generator, enclosed in a single waterproof, and dustproof case with the purpose of driving magnetic and/or electromagnetic pole pieces rotationally past an integrated stationary coil for the production of electrical energy.

BRIEF SUMMARY OF THE INVENTION

This invention is directed to an internal combustion engine and an improved stationary or portable power source employing an internal combustion engine and generator combination, and more specifically includes a novel stationary block, rotary engine which optionally integrates an electrical generator with a piston actuated rotary cam-track assembly capable of optimizing the combustion process and converting combustion energy into mechanical output power or into electrical energy. The engine's outer case and block containing the combustion cylinders and pistons remain rotationally stationary while the endless twin-cam-tracks optionally supporting magnets and/or electro magnets are made to rotate within a stationary coil disposed internally to the stationary outer case halves. The engine combustion cylinders and pistons preferably operate generally similar to a two-cycle engine but without the negative environmental impacts associated with two-cycle engines. The unlimited configurations and refinements offered by this engine design during all facets of the combustion process, combined with the advantages of an application requiring a very limited operating speed range, provides the framework by which an extremely efficient use of any liquid or gaseous fuel can be realized while producing unprecedented advantages in size, weight and power density for power generation equipment. The integration of both the stationary block rotary engine, having a greatly reduced parts count and far greater power density than conventional engines, with the electric generator, which requires only the addition of rotating magnets that rotate with the rotating cam-track assembly and a stationary coil that may be attached to or be a part of the outer case halves, also offers substantial improvements in manufacturing as well as the operating cost per kilowatt.

It is the intention that at least one embodiment of this invention to provide an enclosed rotary internal combustion engine/generator with a stationary engine block and rotating cam-track assembly requiring no main shaft or sleeve bearings which would require seals that would adversely affect durability and cost.

It is the intention that at least one embodiment of this invention to provide an enclosed rotary internal combustion engine/generator with a stationary engine block and rotating cam-track assembly requiring no main shaft or sleeve bearings which would require rotary valves and additional rotary seals further adversely affecting durability and cost.

It is further the intention that at least one embodiment of this invention to provide an enclosed rotary internal combustion engine/generator with a stationary engine block and rotating cam-track assembly requiring no main shaft or sleeve bearings which would require rotary valves and additional rotary seals which could fail adversely affecting air quality.

It is still another intention of at least one embodiment of this invention to provide an enclosed rotary internal combustion engine/generator with a stationary engine block and rotating cam-track assembly which will provide improved engine cooling means.

Still another intention of at least one embodiment of this invention is to provide an enclosed rotary internal combustion engine/generator with a stationary engine block and rotating cam-track assembly which will provide reduced internal friction losses.

Still another intention of at least one embodiment of this invention is to provide an enclosed rotary internal combustion engine/generator with a stationary engine block and rotating cam-track assembly which will provide reduced exhaust pressure to enhance cylinder cooling and cleaning.

Another intention of at least one embodiment of this invention is to provide an enclosed rotary internal combustion engine/generator with a stationary engine block and a rotating cam-track assembly which is located on and by the stationary block and within the stationary outer case halves of the assembly.

Yet another intention of at least one embodiment of this invention is to provide an enclosed rotary internal combustion engine/generator with a stationary engine block and a rotating cam-track assembly equipped with improved low friction bearings to increase output power, conserve energy and increase durability.

Still another intention of at least one embodiment of this invention is to provide an enclosed rotary internal combustion engine/generator with a stationary engine block and a rotating cam-track assembly capable of supporting magnets and/or electro magnets for the production of electrical energy.

A further intention of at least one embodiment of this invention is to provide a rotating cam-track assembly capable of supporting any number of magnets and/or electro magnets for the production of electrical energy regardless of the number of cylinders employed in the stationary block.

It is another intention of at least one embodiment of this invention to provide an engine design that would allow the use of Plug-In-Piston technology to improve combustion efficiency and output power.

It is an intention of at least one embodiment of this invention to provide a unitary internal combustion engine generator with a stationary engine block and a rotating cam-track assembly having vastly improved flexibility of design in order to optimize all facets of the combustion process and to maximize the subsequent internal conversion of combustion energy directly into electrical energy.

It is another intention of at least one embodiment of this invention to provide an internal combustion engine/generator with a stationary engine block and a rotating cam-track assembly having a prolonged dwell at the top of the piston stroke whereby the ignited air/fuel mixture in the cylinder is allowed to combust more completely while the piston is substantially stationary relative to its position in its related cylinder.

Yet another intention of at least one embodiment of this invention is to provide an internal combustion engine/generator with a stationary engine block and a rotating cam-track assembly having a prolonged dwell at the top of the piston stroke whereby the ignited air/fuel mixture in the cylinder is allowed to expand more completely to provide a means to produce much greater cylinder pressure while the piston is substantially stationary relative to its position in its related cylinder.

It is yet another intention of at least one embodiment of this invention to provide an internal combustion engine/generator with a stationary engine block and a rotating cam-track assembly requiring no form of head gasket or main bearing cap which would limit the engines ability to withstand extremely high cylinder pressures.

It is still another intention of at least one embodiment of this invention to provide an internal combustion engine/generator with a stationary engine block and a rotating cam-track assembly having an infinitely variable cam-track configuration such that an optimized transformation of the linear motion of the piston is converted into the an optimized rotary motion of the combined cam-track and generator armature assembly.

Still another intention of at least one embodiment of this invention is to provide an internal combustion engine/generator with a stationary engine block and a rotating cam-track assembly having a prolonged dwell at the bottom of the piston stroke whereby exhaust of spent gases is accomplished while the piston is substantially stationary relative to its position in its cylinder eliminating internal energy losses related to the forced expulsion of exhaust gases by the forced movement of the piston.

It is still another intention of at least one embodiment of this invention to provide an internal combustion engine/generator with a stationary engine block and a rotating cam-track assembly in which there is a prolonged dwell at the bottom of the piston stroke such that each piston carrying cylinder may be cleaned or purged of spent gases while the piston is generally stationary relative to its position in its cylinder.

A further intention of at least one embodiment of this invention is to provide a prolonged dwell at the bottom of the piston stroke in a multi-cylinder internal combustion engine/generator with a stationary engine block and a rotating cam-track assembly whereby each cylinder is cleaned, purged and air cooled internally while exhaust valves are held open in a prolonged substantially stationary position.

Still another intention of at least one embodiment of this invention is to provide an environmentally friendly two-cycle styled, multiple cylinder and piston, internal combustion engine/generator with a stationary engine block and a rotating cam-track assembly in which each piston has a prolonged dwell period, such that a related cylinder exhaust valve is in a complete state of closure prior to the introduction of fuel into the cylinder so as to eliminate pre-combustion pollutants from escaping into the atmosphere.

A further intention of at least one embodiment of this invention to provide an environmentally friendly, clean two-cycle styled rotary engine/generator embodying an advanced combination rotary cam-track and generator armature assembly capable of operating as a two-cycle engine without the addition of lubricating oils or compounds within the fuel of choice, so as to further reduce exhaust pollutants.

It is a further intention of at least one embodiment of this invention to provide an environmentally friendly, clean two-cycle styled rotary engine/generator embodying an advanced combination rotary cam-track and generator armature assembly capable of dictating multiple firings of each cylinder in the course of a single complete rotation of the cam-track assembly.

It is another intention of at least one embodiment of this invention to provide an advanced rotary internal combustion engine, with a stationary engine block and a rotating cam-track assembly, designed for use in a unitary engine/generator embodying the features of the aforestated objects.

It is still another intention of at least one embodiment of this invention to provide a means for generating electrical energy utilizing a stationary block internal combustion engine to cause rotation of a cam-track assembly which includes magnets and/or electro magnets to form a complete rotating generator armature assembly.

An overall intention of at least one embodiment of this invention is to provide a compact, lightweight, means of providing a highly efficient source of stationary and/or portable electrical power, and which is dependable in use, economical to manufacture and friendly to the environment.

It is an intention of at least one embodiment of the invention to provide an engine comprising: a stationary engine block having at least one cylinder; a piston moveable coaxially within each of said at least one cylinder; at least one cam follower associated with each piston; at least one rotatable cam plate; an endless cam track formed within the cam plate, the at least one cam follower being operationally engaged with said cam track; and a stationary housing encasing said engine block and said at least one rotatable cam plate; wherein combustion actuation of each piston serves to rotatably drive said at least one cam plate.

It is also an intention of at least one embodiment of the invention to provide an engine including a spark plug which is attached to and moves in unison with each piston; a spark plug electrode disposed within each piston, the spark plug electrode extending between said spark plug and a piston wrist pin electrode; and an electrical energy transmitter which aligns with the wrist pin at at least one point during the travel of the piston within the cylinder, to transmit electrical energy to said wrist pin electrode.

It is further the intention of at least one embodiment of the invention to provide an engine/generator including: a stationary electric coil, and at least one magnetic mass mounted for movement with the at least one cam plate to generate electrical energy in response to orbital movement of said magnetic mass past said electric coil.

It is a still further intention of at least one embodiment of the invention to provide a method of generating power comprising the steps of: providing an engine comprising: a stationary engine block having at least one cylinder; a piston moveable coaxially within each of said at least one cylinder; at least one cam follower associated with each piston; at least one rotatable cam plate; an endless cam track formed within the cam plate, the at least one cam follower being operationally engaged with said cam track; and a stationary housing encasing said engine block and said at least one rotatable cam plate; and rotatably driving said at least one cam plate by combustion actuation of each piston.

Having described this invention, the above and further objects, features and advantages thereof will become readily apparent to those skilled in the art from the following detailed description of a preferred embodiment illustrated in the accompanying drawings.

BRIEF DESCRIPTION OF THE DRAWING FIGURES

FIG. 2 is an exploded side sectional elevational view and the respective top or bottom elevational views of the parts associated with the rotating cam-track/armature assembly;

FIG. 3 is a top elevational view of the assembled rotating cam-track/armature parts illustrated in FIG. 2 with the cam-track surfaces shown highlighted as solid lines for clarity;

FIG. 3A is a full cross sectional view taken substantially along section line 3A-3A of FIG. 3 to illustrate the assembled side view arrangement of the parts therein;

FIG. 4 is a top elevational view of the stationary engine block;

FIG. 4A is a full cross sectional view of the stationary engine block taken substantially along section line 4A-4A of FIG. 4 to clearly illustrate a side view of the internal structure of the stationary engine block;

FIG. 6 is a top cross sectional view taken substantially along section line 6B-6B of FIG. 6A to illustrate the assembled arrangement of the stationary and the rotating parts therein, except that for the sake of clarity, the engine block and the bottom outer case are not shown as a sectional view;

FIG. 6A is a full cross sectional side view taken substantially along section line 6A-6A of FIG. 6, but assembled and shown with the inclusion of the removed top case of FIG. 6 to illustrate the assembled arrangement of all the parts therein;

FIG. 7 is a top cross sectional view taken substantially along section line 7B-7B of FIG. 7A and is similar to FIG. 6, except for the inclusion of the cam-track layout that is present in the unseen top case and the removal of the radial ball bearings at the cylinders for the purpose of better clarity;

FIG. 7A is a full cross sectional side view with assembled top case similar to FIG. 6A taken substantially along vantage line 7A-7A of FIG. 7 and looking in the direction of the arrows thereon;

FIG. 8 is a top cross sectional view taken substantially along section line 8B-8B of FIG. 8A and is similar to FIG. 7, except that the rotating cam track assembly as seen in FIG. 3 and the associated piston assemblies of FIG. 1A are shown after partial rotation of the cam-track assembly;

FIG. 8A is a full cross sectional side view with assembled top case similar to FIG. 7A taken substantially along vantage line 8A-8A of FIG. 8 and looking in the direction of the arrows thereon to show the effect of the rotation of the cam track assembly of FIG. 3 on the piston assemblies of FIG. 1B as well as on the valve assemblies of FIG. 1;

FIG. 9 is a top cross sectional view taken substantially along section line 9B-9B of FIG. 9A and is similar to FIG. 8, except that the rotating cam track assembly as seen in FIG. 3 and the associated piston assemblies of FIG. 1A are shown after additional rotation of the cam track assembly;

FIG. 9A is a full cross sectional side view with assembled top case similar to FIG. 8A taken substantially along vantage line 9A-9A of FIG. 9 and looking in the direction of the arrows thereon to show the effect of the additional rotation of the cam track assembly of FIG. 3 on the piston assemblies of FIG. 1B as well as on the valve assemblies of FIG. 1;

DETAILED DESCRIPTION OF THE PREFERRED EMBODIMENTS

The description which follows will set forth the features of a currently preferred embodiment of this invention and more specifically will describe the features of the engine/generator utilizing a unique environmentally clean operating, two-cycle type, four cylinder engine, with a rotating twin-cam track and generator armature combination, and having a stationary block rotary engine designed to operate at a relatively fixed speed with the purpose of providing an optimized combustion process and increased overall efficiency while producing 220 volts of 3 phase alternating current. This is not the only form that the engine/generator of this invention can take, nor is it the only form of electrical energy it can produce. However, the herein described and illustrated form of this invention is the best mode presently contemplated to enable those skilled in the art to practice this invention.

Figure 1:
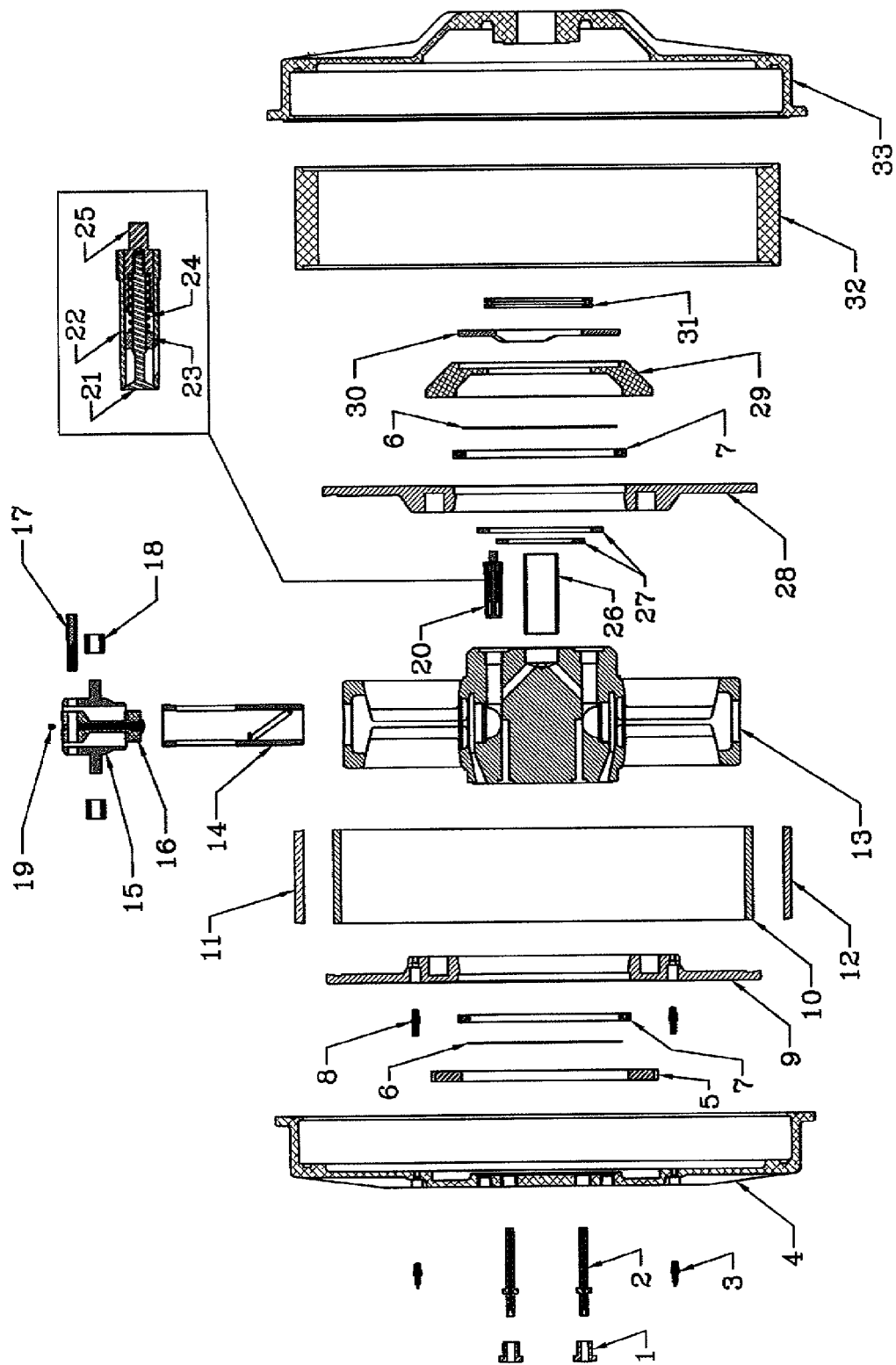
FIG. 1 is an exploded side sectional elevational view of the stationary block engine/generator showing the major parts of the engine/generator referenced in the hereinafter appearing description of this invention.

As noted, FIG. 1 is an exploded side sectional elevational view of the engine/generator of this invention illustrating its several major parts which will be referenced from time to time in the description of this invention to follow.

It will be noted that the elemental portions of the engine/generator illustrated in FIG. 1 are labeled by number for ease in tracking such designated parts throughout the ensuing drawing figures.

As shown for the several parts, a reference number designation for each are as listed below:

| Reference Number | Description |
| --- | --- |
| 1 | Fuel injector clamps |
| 2 | Fuel injectors |
| 3 | Spark plugs |
| 4 | Top case half making up one half of the engine/generator enclosure |
| 5 | Ring gear |
| 6 | Snap rings used to retain the radial main bearings |
| 7 | Main radial ball bearings |
| 8 | Spark conductors used to advance the spark to the plug-in-piston spark plugs |
| 9 | Upper cam-track plate |
| 10 | Armature ring |
| 11 | Armature magnets |
| 12 | Armature clamps |
| 13 | Stationary engine block |
| 14 | Cylinders |
| 15 | Cylinder sleeves |
| 16 | Pistons (Plug-In-Piston style) |
| 17 | Wrist pin electrode assemblies |
| 18 | Cam roller assemblies |
| 19 | Locating set screws |
| 20 | Valve assemblies |
| 21 | Valve stem (1 per Valve assembly) |
| 22 | Valve body (1 per Valve assembly) |
| 23 | Valve guide (1 per Valve assembly) |
| 24 | Valve spring (1 per Valve assembly) |
| 25 | Exhaust valve cam (1 per Valve assembly) |
| 26 | Exhaust pipe |
| 27 | Exhaust valve cam alignment bearings |
| 28 | Lower cam-track plate |
| 29 | Exhaust valve actuating cam-ring retainer |
| 30 | Exhaust valve actuating cam-ring |
| 31 | Thrust bearing |
| 32 | Stationary electrical coil |
| 33 | Bottom case half |

There will also be reference made to certain assemblies made up of parts listed above. Those assemblies, and reference number designation for each are as listed below:

| Reference Number | Description |
| --- | --- |
| 20 | Valve assemblies |
| 39 | Piston assemblies |
| 75 | Cam-track/armature assembly |

Figures 1A, 1B:
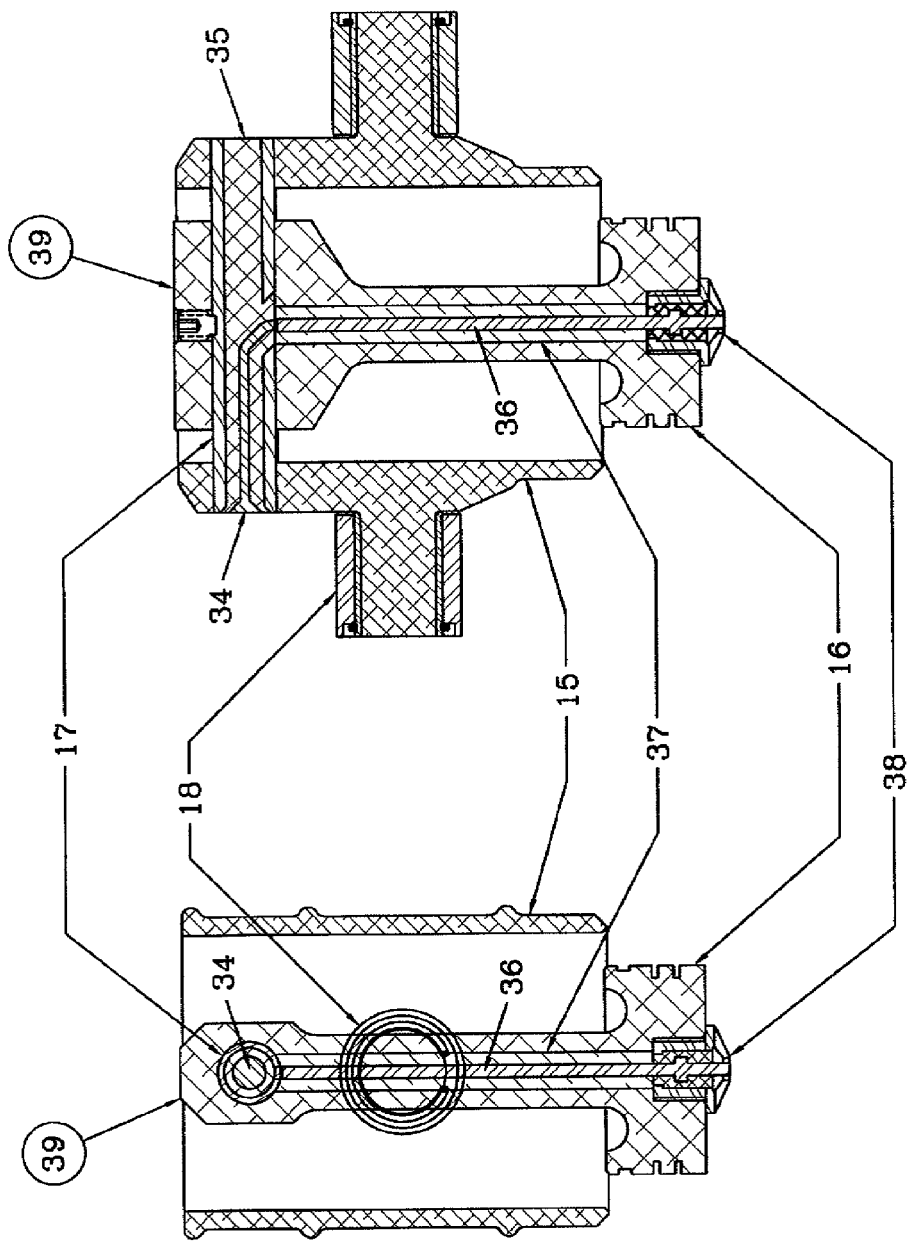
FIG. 1A is an enlarged top sectional view of the piston assembly taken to show the top elevation of the assembly generally through the center line of the component parts and with the addition of the top cam bearing.
FIG. 1B is an enlarged side sectional view of the piston assembly taken generally through the center line of the assembled component parts.

Turning now to FIG. 1A and FIG. 1B of the drawings, there is depicted an enlarged top sectional view (FIG. 1A) and an enlarged side sectional view (FIG. 1B) of the piston assembly 39 taken to show the respective top and side assembly views generally through the center line of the cylinder sleeves 15, the "Plug-In-Piston" pistons 16 with their electrodes 36, insulators 37 and their spark plug heads 38, from which the combustion spark originates within the combustion chamber at the time of combustion. Also seen are the wrist pin electrode assemblies 17 with their electrodes 34 and the insulating material 35 that is used to connect the "Plug-In-Piston" pistons 16 to the cylinder sleeves 15 in a fixed position so that all parts of the piston assembly 39 move together as a single unit through the interaction of the cam roller assemblies 18 and the outside cam track 45 which will be seen and described in greater detail later in this description. The "Plug-In-Piston" pistons 16 are optional features, and conventional pistons may instead be utilized as well.

FIG. 2 of the drawings is an exploded side sectional elevational view and the respective top or bottom elevational views of the parts associated with the rotating cam-track/armature assembly. The ring gear 5 may be provided as a means by which ancillary equipment (not shown) such as fuel pumps, oil pumps and air pumps can be operated by the rotation of the cam-track/armature assembly. The ring gear 5 is attached by means of standard locating dowels and fasteners to the top face of the upper cam-track plate 9. This attachment also provides a clamping nest for the outer race of one of the two main radial bearings 7, preferably ball bearings, that support and provide accurate, low friction rotation of the cam-track/armature assembly. Two insulated spark conductors 8 are used to advance the spark to the "Plug-In-Piston" spark plugs seen in FIG. 1A & 1B. The insulated spark conductors 8 may be threadably attached to the upper cam-track plate 9. The upper cam-track plate 9 may also be provided with a groove near the outside diameter into which the armature ring 10 may be precisely located and attached by means of standard locating dowels and fasteners. The armature ring 10 serves to provide a precise dimension between the upper cam-track plate 9 and the lower cam-track plate 28 which may also be provided with a groove near the outside diameter into which the armature ring 10 may be precisely located and attached by means of standard locating dowels and fasteners. The armature ring 10 also serves to provide a concentric outside diameter onto which the armature magnets 11 may be located and clamped by the armature clamps 12 which are provided with angular ends made to compliment the angular ends of the armature magnets 11. The armature clamps 12 may be provided with mounting holes made to accept standard fasteners which may threadably connect the armature clamps 12 to the armature ring 10 in order to provide accurate spacing and clamping means for the armature magnets 11. The armature magnets 11 may be located or otherwise disposed on either/both cam-track plates 9, 28 by any conventional means. In another embodiment, the armature magnets 11 and the armature clamps 12 may also be centered, aligned and clamped by their interaction with complimenting angular faces provided in the upper cam-track plate 9 and the lower cam-track plate 28 as can be seen in the assembly drawing FIG. 3A. The lower cam-track plate 28 is also provided with the second of the two main radial bearings 7, preferably ball bearings or roller bearings, that support and provide accurate, low friction rotation of the cam-track/armature assembly. The lower main radial bearing 7 may also fit into a nest in the lower cam-track plate 28, and the outer race of the bearing may be clamped by the attachment of the exhaust valve actuating cam-ring retainer 29 by means of standard locating dowels and fasteners into the lower cam-track plate 28. The exhaust valve actuating cam-ring 30 with its two raised cam-lands 47 and its two lower cam-lands 48 is located by a machined pocket in the exhaust valve actuating cam-ring retainer 29 and securely mounted by means of standard locating dowels and fasteners. The weight of the entire rotating assembly and the pressure exerted by the forces applied to the two raised cam lands 47 during operation of the engine/generator is applied to the thrust bearing 31, preferably a ball bearing type thrust bearing, which is in full contact with the cam-ring 30. The cam-ring 30 is an optional feature. The valves may be actuated by any conventional mechanical or electro-mechanical means.

In a certain preferred embodiment, the valves may be operated by independent electro/magnetic actuators, or some like devices, and controlled by a computer processor. This is particularly useful in an embodiment in which the use of various different fuels may by desirable. The pressure in the combustion chamber can be regulated and modified during operation (on-the-fly), in order to optimize the combustion characteristics of multiple fuel types by controlling the timing of the exhaust valves closing.

For example, when the engine is operating during periods of heavy load a high-energy fuel, such as diesel fuel, which requires much higher cylinder pressures may be more desirable. The exhaust valve in this example would be made to close early, shortening the internal cylinder cooling cycle and allowing more time in the pre-compression mode, prior to the inward movement of the piston, to pre-pressurize the cylinder with fresh air. This action will provide much higher cylinder pressures after the compression cycle. Conversely, during times of low output requirements and low engine loads, a less powerful but cleaner and less expensive fuel, such as natural gas, may be more desirable. During these times the compression ratio in the cylinders would be reduced by closing the exhaust valve later, even after the inward movement of the piston has begun in the compression cycle, thereby allowing fresh air within the cylinder to escape out the exhaust valve, reducing the volume of air to be compressed in the cylinder. This action also reduces the operating loads within the engine, further increasing efficiency of operation.

It should be noted that even in the situation of a single fuel being used, it may be advantageous to control cylinder pressure and the amount of fresh air within the cylinder based on load, allowing more compressed air as the amount of load increases, and therefore the amount of fuel is also increased. Conversely, the valves may be timed to lower cylinder pressure and fresh air volume within the cylinder as the amount of load and fuel is decreased.

The computer processor may be pre-programmed to time the actuation of the valves based upon an input for certain fuel types and/or based on current load values. Alternatively, or in conjunction with the above, the engine may be provided with combustion and exhaust sensors, and feedback from those sensors may be input into the computer processor to optimize the valve timing automatically based on current conditions.

Attention should be given to the two opposing top and bottom views of the upper cam-track plate 9 and the lower cam-track plate 28 where the outer cam-track surface 45 and the inner cam-track surface 46 can be seen. It should be clear that the cam-track configurations for both the upper cam-track plate 9 and the lower cam-track plate 28 are mirror images of each other. It should also be noted that the precise alignment of the cam-track plates may be assured by the use of standard locating dowels and fasteners when assembled to the armature ring 10.

FIG. 3 is a top elevational view of the assembled rotating cam-track/armature parts illustrated in FIG. 2 with the outer cam-track surface 45 and the inner cam-track surface 46 shown highlighted as solid lines for clarity. FIG. 3A is a full cross sectional view taken substantially along section line 3A-3A of FIG. 3 to illustrate the assembled side view arrangement of the rotating cam-track/armature parts therein. Both FIG. 3 and FIG. 3A depict the arrangement and interaction of the assembled parts. The ring gear 5 is clearly seen in FIG. 3 and FIG. 3A. In FIG. 3 the ring gear 5 is clearly seen attached by means of standard locating dowels and fasteners to the upper cam-track plate 9. The main radial bearings 7 are also clearly visible in FIG. 3, and the nested and clamped arrangement of the outer bearing race of the upper main radial bearing 7 is evident in FIG. 3A.

The armature ring 10 can be seen in FIG. 3 as well as the locating dowels 50 and the standard fasteners 51 that are used to secure the precise location of the upper cam-track plate 9 relative to the armature ring 10. It should be understood that the same precise location and fastening means may be used to secure the armature ring 10 to the lower cam-track plate 28. Precise construction holes 49 may be provided in both the upper cam-track plate 9 and the lower cam-track plate 28. These holes may serve not only to insure the precise location of the upper cam-track plate 9 and the lower cam-track plate 28 during machining, but may be provided as a vent, or escape hole to prevent the accumulation of lubricating oil in the rotating cam-track assembly during operation. In FIG. 3A the grooves near the outside diameter of the upper cam-track plate 9 and the lower cam-track plate 28, into which the armature ring 10 may be precisely located and attached, can be clearly seen. The angular clamping arrangement of the upper cam-track plate 9 and the lower cam-track plate 28 on the armature magnets 11 are also evident in FIG. 3A. In FIG. 3, the armature magnets 11 with their angular ends can be seen as they interact with the angular ends of the armature clamps 12 which may be threadably attached to the armature ring 10 by means of the standard fasteners 52 providing precise and secure location of the armature magnets 11 on the outermost diameter of the cam-track/armature assembly.

In FIG. 3A, the exhaust valve actuating cam-ring retainer 29 can be seen located in an under-cut portion of the lower cam-track plate 28 where it is securely held in place and positioned by standard locating dowels and fasteners. The nested and clamped arrangement of the outer bearing race of the lower main radial bearing 7 is again evident because of the attachment of the actuating cam-ring retainer 29 to the lower cam-track plate 28. The exhaust valve actuating cam-ring 30 may also be located in an under-cut portion of the exhaust valve actuating cam-ring retainer 29 where it may also be securely held in place and positioned by standard locating dowels and fasteners. The preferred orientation of the exhaust valve actuating cam-ring 30 and its two raised cam lands 47 can be seen in FIG. 3 and in FIG. 3A.

Finally, the entire assembly of the cam-track and the generator-armature parts as seen in FIG. 3 and FIG. 3A will be referred to in the remainder of this description as the cam-track/armature assembly 75. In FIG. 3A the cam-track/armature assembly 75 can be seen resting on the thrust bearing 31 which would be oriented on a horizontal plane at the bottom of the cam-track/armature assembly 75. The thrust bearing 31 is oriented on the same center line as the cam-track/armature assembly 75, directly under the raised cam lands 47 and is in full surface contact with the bottom surface of the exhaust valve actuating cam-ring 30. The thrust bearing 31 is located in a pocket in the bottom case half 33 (see FIG. 1) which will be seen in detail later in this description.

Figure 3B:
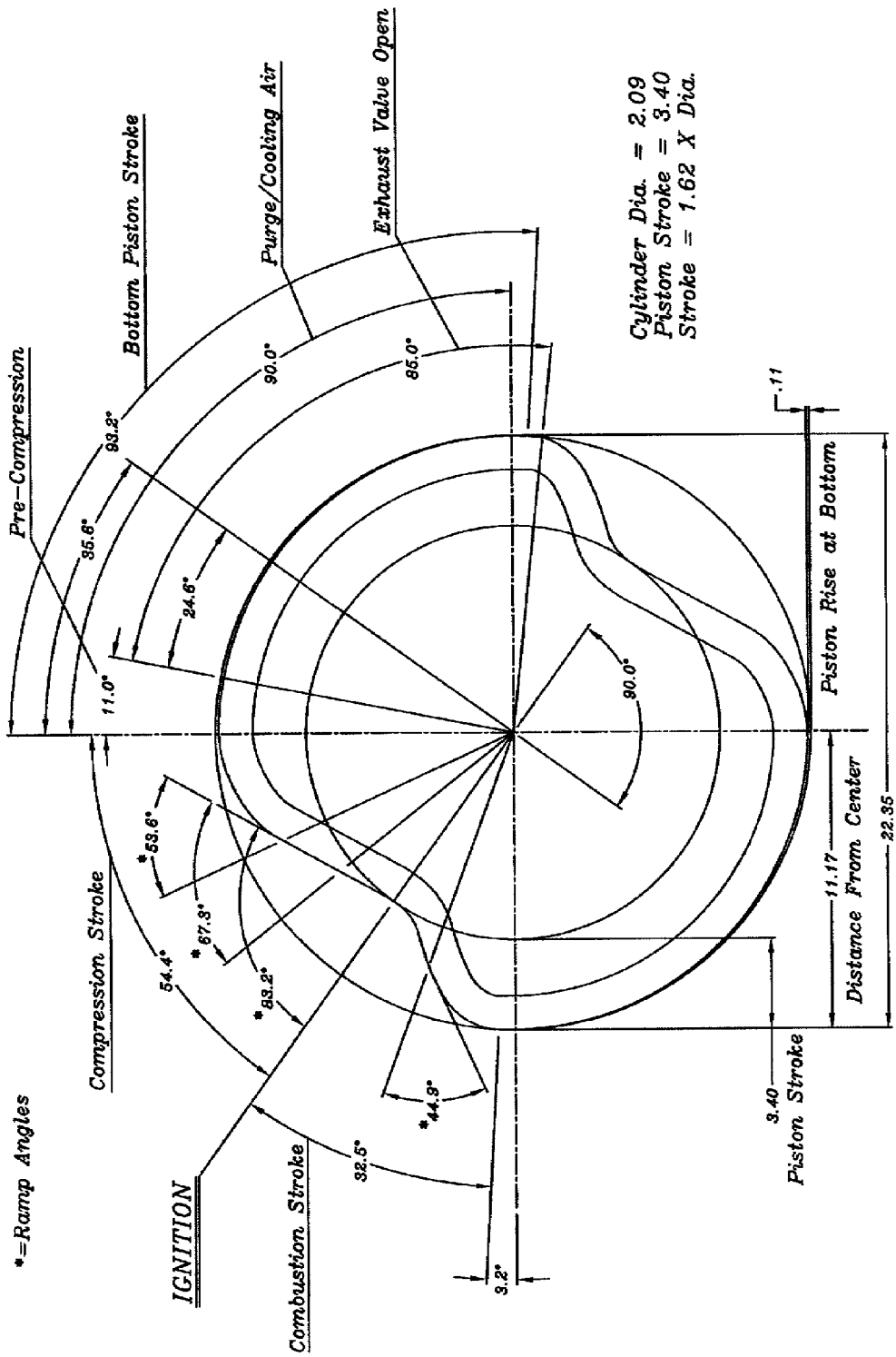
FIG. 3B is a graphic illustration of the preferred embodiment of the cam track in which the cam related piston functions are indicated.

FIG. 3B is a graphic illustration of the preferred embodiment of the cam track in which the cam related piston functions are indicated. It should be clear that in this preferred embodiment, the cam-track configuration is such that each cylinder of the engine/generator will provide two complete combustion events in the course of a single 360 degree rotation of the cam-track/armature assembly 75 of the engine/generator. Therefore, the four cylinder engine/generator which is shown will produce eight complete combustion events in the course of one single rotation of the cam-track/armature assembly 75. It must be understood that the number of cylinders as well as the number of combustion events per revolution is only limited by the physical size and output requirement of the particular engine/generator design. There are no limitations on the number of cylinders, magnets/electromagnets or combustions per revolution implied in this preferred embodiment. It should also be noted that FIG. 3B is only provided to clearly show the great flexibility of the design that is offered by this configuration.

It will be noted that the engine hereof is in many respects similar to the teaching and disclosure of a four cylinder engine set forth in my prior U.S. Pat. No. 4,653,438 issued Mar. 31, 1987, entitled "Rotary Engine" and also in my disclosure of a six cylinder engine/generator set forth in my prior U.S. Pat. No. 6,230,670 issued May 15, 2001 entitled "Engine Generator", both of which are incorporated herein by reference in their entirety. Certain exceptions to the later "Engine Generator" of that patent are found in the stationary engine block 13, the rotating cam-track/armature assembly 75, the simplified top case half 4, the simplified bottom case half 33, the main radial bearings 7, the direct injection capabilities of the fuel injectors 2, the improved hemispherical head design 60, the improved engine block water cooling capability and the new "Plug-In-Piston" assemblies 39 (Pat. Pending). It should also be noted that the cylinders used in this current invention are modified from my prior U.S. Pat. No. 5,636,599 issued Jun. 10, 1997, entitled "Cylinder Assembly" and the valve assemblies used in this current invention are from my prior U.S. Pat. No. 5,701,930 issued Dec. 30, 1997, entitled "Modular Valve Assembly", both of which are incorporated by reference in their entirety.

Turning now to FIG. 4 and FIG. 4A, in general it is to be understood that the engine portion of the engine/generator comprises a stationary engine block 13. The stationary engine block 13 may have a shape similar to that of a wheel with a central hub that contains the combustion chambers 60, bores 59 to receive and threadably secure the exhaust valve assemblies 20 (FIG. 1) and exhaust bores 62 to communicate exhaust gasses to the threaded exhaust pipe 26 (FIG. 1) which may be secured to the stationary engine block 13 at the threaded bore 65). There may be a radial groove 63 provided in the engine block 13 to accept the exhaust valve cam alignment bearings 27 (FIG. 1) which may be used to insure the proper alignment of the exhaust valve cams 25 (FIG. 1). The two main radial bearings 7 (FIG. 1) may be located with a light resistance fit on surfaces 55 and secured by snap rings 6 (FIG. 1) that fit into the snap ring slots 56 of the stationary engine block 13. During operation, cylinder purge and cooling air may be conveyed into the cylinders through the purge air port 57 into a relief groove 58 that surrounds the cylinders 14 (FIG. 1) and directed into the cylinder through the cast port 71 (FIG. 8A) which may be located in the outside diameter wall of the cylinder (14) and into the cylinder at the cast port 72 (FIG. 8A) which may be located in the inside diameter wall of the cylinder 14. The fuel injector bore 61 with a counter bored seat may be provided for each combustion chamber at the innermost quadrant of the hemispherical combustion chamber. This fuel injector bore 61 may be used to accept fuel injectors 2 (FIG. 1) and thereby convey fuel into the cylinders at the proper time prior to combustion. In this view, eight coolant holes 64 are shown which are cast into the hub portion of the stationary engine block 13. These cast holes may be located in close proximity to the combustion chambers 60 as well as the bores 59 used to receive the exhaust valve assemblies (20 in FIG. 1) and provide cooling to those areas where combustion heat is concentrated. Looking now toward the outside diameter of the stationary engine block 13, four open windows are optionally provided through the stationary engine block 13 defined by eight parallel curved stiffening walls. These stiffing walls are further defined by the cross sectional view (54 in FIG. 4). The web sections between the adjoining stiffening walls may be provided with holes 53 through the web to reduce weight and allow lubricating oil to drain freely. The purpose of the webs and the stiffening walls is to provide rigid support for the outermost ring of the stationary engine block 13 which is used to support the outermost ends of the cylinders 14 (Fig, 1). The cylinders 14 (FIG. 1) may be threadably attached to the stationary engine block (13) at both ends of the cylinders using the threaded sections (66 in FIG. 4 and FIG. 4A).

Figure 4B:
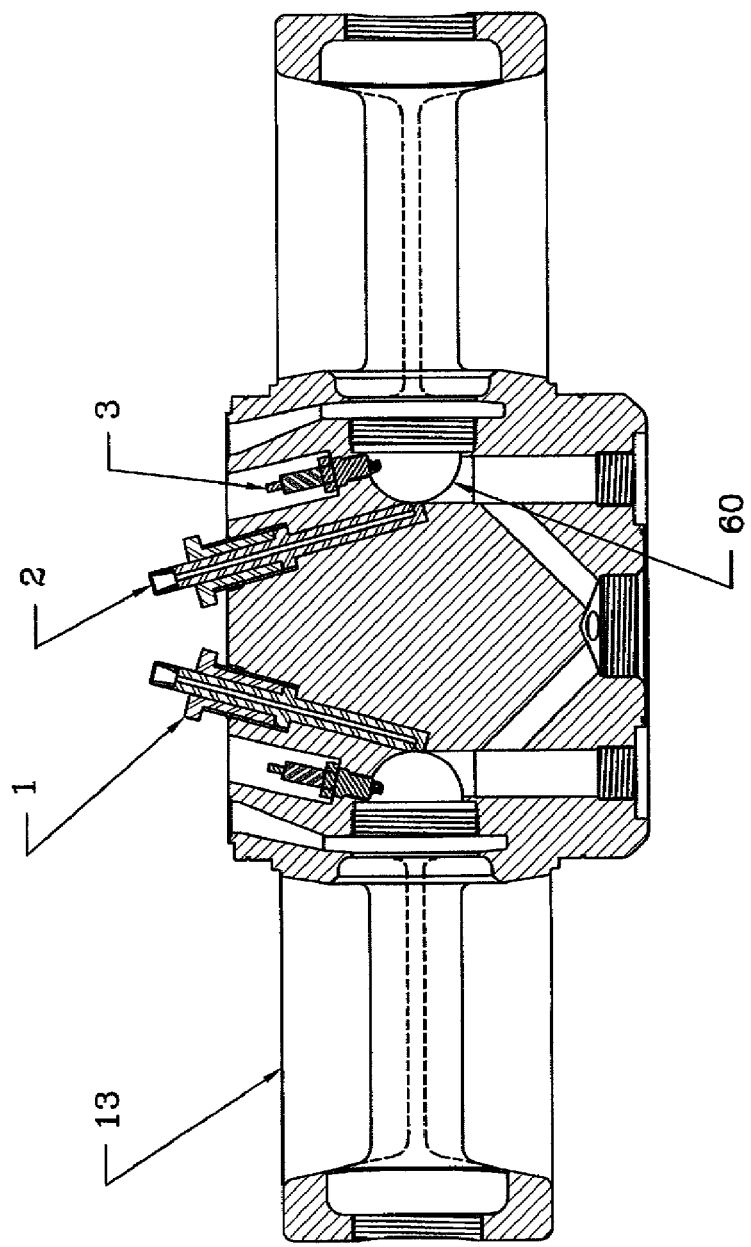
FIG. 4B is an optional or alternative full cross sectional side view layout of the stationary engine block which is horizontally oriented and also taken substantially along section line 4A-4A of FIG. 4 showing the inclusion of an optional standard type spark plug or glow plug as well as a modified arrangement for the location and mounting of fuel injectors.

In FIG. 4B we can see a horizontally oriented optional configuration for the stationary engine block 13. In this configuration all the features of FIG. 4 and FIG. 4A are the same with the exception of the location of the fuel injector 2 the addition of the fuel injector clamp 1 into the stationary engine block 13 and the addition of a standard spark or glow plug 3 directly into the combustion chamber 60. These modifications or options are provided to allow the engine/generator to function in the most efficient manner possible regardless of the fuel being used. For example, if a heavy fuel such as diesel is being used it would be desirable to use a glow plug rather than a spark plug and the configuration seen in FIG. 4B would be the most appropriate for glow plug applications. In some high energy or high efficiency applications it may be preferable to have two separate sparks provided at different locations in the cylinder and fired at different times during the combustion process to provide maximum combustion. In those applications both the Plug-In-Piston configuration, which will be defined in greater detail later in this description, and the stationary spark plug as seen in FIG. 4B inserted directly into the combustion chamber 60 could be used. Finally, in those applications where economy is a priority, the configuration seen in FIG. 4B would be more desirable than the more expensive Plug-In-Piston design. In those applications a standard, solid piston with no spark plug included in it would replace the Plug-In-Piston design. These changes or options have no other effect on the overall design of the engine/generator being described in this preferred embodiment.

Figure 5:
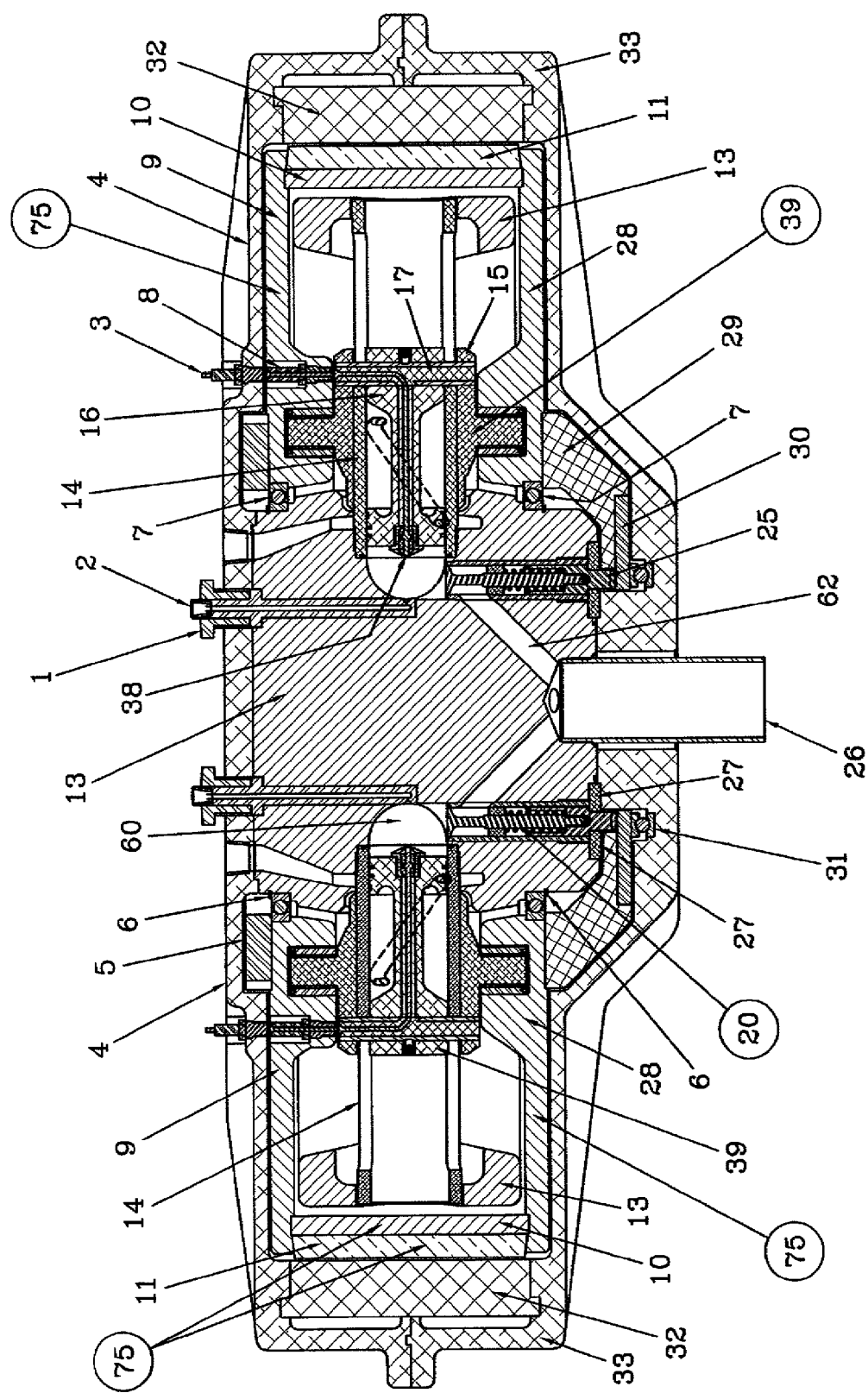
FIG. 5 is an enlarged full cross sectional side assembly view taken substantially along a section line similar to that used in section line 3A-3A of FIG. 3 to clearly illustrate the assembly of all the major parts of the engine/generator as referenced in FIG. 1 in their preferred operating orientation.

FIG. 5 is a complete assembly of all the parts noted in FIG. 1 and is shown as an exploded side sectional elevational view of the engine/generator of this invention. This view also shows this preferred embodiment of the engine/generator in its preferred operating position which is horizontally oriented with the exhaust pipe 26 located on the bottom during operation. Two of the four valve assemblies 20, and two of the four piston assemblies 39 can be seen, as well as the rotating cam-track/armature assembly 75. The cylinders 14 can be seen threadably attached to the stationary engine block 13. The Plug-In-Pistons 16 (FIG. 1A and FIG. 1B) of the piston assembly 39 can be seen inside the cylinders 14 and attached to the cylinder sleeves 15 (FIG. 1A and FIG. 1B) which are in a slip fit arrangement with the outside diameter of the cylinders 14 and connected to the Plug-In-Pistons 16 (FIG. 1A and FIG. 1B) by the wrist pin electrode assemblies 17 making the complete piston assembly 39. The operation of the Plug-In-Piston design can be best understood in this view of the engine/generator. As can be seen, the cam-track/armature assembly 75 is in a rotational position such that the spark conductors 8, used to advance the spark to the Plug-In-Piston assembly 39 and ultimately to the spark plug heads 38 seen in FIG. 1A and FIG. 1B, are in alignment with the spark plugs 3 mounted in the top case half 4. A high energy spark is jumped from the spark plug 3 to the spark conductor 8 and again to the wrist pin electrode 34 of the piston assembly 39 causing an ignition spark at the spark plug head 38 in the combustion chamber 60. The advantages of this unusual configuration are described in greater detail in my pending patent application titled "Plug-In-Piston" U.S. Ser. No. 12/142,999, incorporated by reference herein in its entirety. In later views of the stationary block engine/generator the rotational movement of the spark conductor 8 with the cam-track/armature assembly 75, as well as the movement of the piston assembly 39 in response to the ignition and explosion of the selected fuel in the combustion chamber 60, is shown.

FIG. 6 and FIG. 6A are paired together to show the operation of the stationary block engine/generator from two related vantage points. FIG. 6 is a top cross-sectional view taken substantially along section line 6B-6B of FIG. 6A to illustrate the assembled arrangement of the stationary and the rotating parts therein, except that for the sake of clarity, the engine block 13 and the bottom case half 33 are not shown hatched as a sectional view, and the cam roller assemblies (18 in FIG. 1A) are shown to aid in the clarity of the description of operating events that follow. FIG. 6A is a full cross-sectional side view taken substantially along section line 6A-6A of FIG. 6, but assembled and shown with the inclusion of the removed top case 4 and all the associated parts therein of FIG. 6 to illustrate the assembled arrangement of all the parts therein.

FIG. 6 shows several features of the assembly. The outermost diameter of the bottom case half 33 is shown, as well as the flange where the standard locating dowels and fasteners are used to securely attach the two case halves in assembly. The stationary electrical coil 32 and the coil output wires 67 are used to transmit the electrical energy produced through the interaction of the rotating armature magnets 11 of the rotating cam-track/armature assembly 75 as they pass the coil windings of the stationary electrical coil 32 in response to the ignition of fuel in the combustion chambers 60. The cylinders 14 can again be seen, in this top view, threadably attached to the stationary engine block 13. The Plug-In-Pistons 16 (FIG. 1A and FIG. 1B) of the piston assembly 39 can be seen inside the cylinders 14 and attached to the cylinder sleeves (15 in FIG. 1A and FIG. 1B) which are in a slip fit arrangement with the outside diameter of the cylinders 14 and connected to the Plug-In-Pistons 16 (FIG. 1A and FIG. 1B) by the wrist pin electrode assemblies 17, making the complete piston assembly 39. Special consideration should be given to the main radial bearings 7 as seen in FIG. 6. In this view the entire lower main radial bearing 7 is shown, however, in all future top views of the engine/generator the lower main radial bearing 7 will be shown only partially for the purpose of increased clarity. The lower main radial bearing 7 will not be shown within the area defined by the outside diameter of the cylinders 14 of any future top views. Finally in this view the eight coolant holes 64 are again visible in close proximity to the combustion chambers 60.

Both related views FIG. 6 and FIG. 6A show additional cooling features. These cooling features are directed to the cooling of the sealed stationary electrical coil 32 within the stationary case 4, 33. Preferably, there may be an under-cut portion 69 provided in both the stationary upper case half 4 and the lower case half 33. Although, any number of under-cut portions 69 may be provided. As shown, these under-cuts provide two separate spaces, channels or cooling fluid pathways 70 between the stationary electrical coil 32 and the two case halves (4 & 33). These cooling fluid pathways 70 are intended to carry any suitable cooling fluid, such as air, water, coolant or oil, across the outermost surface of the sealed stationary electrical coil 32. Preferably this cooling fluid will be circulated around the sealed stationary electrical coil 32 through the cooling fluid pathways 70 in opposite directions to provide more even cooling around the entire outside diameter of the sealed stationary electrical coil 32. This is a very desirable feature especially during times of high energy output or continuous duty operation. The cooling fluid may also be circulated through other parts of the engine block 13.

FIG. 7 and FIG. 7A are quite similar to FIG. 6 and FIG. 6A although for increased clarity regarding the operation of the engine/generator the outside cam-track 45 and the inside cam-track 46, which are located in the unseen top portion of the cam-track/armature assembly 75, more specifically in the upper cam-track plate 9 are shown. The outside cam-track 45 and the inside cam-track 46 will be seen in all future views. It should be understood that during operation the cam-roller assemblies 18 are in constant and continuous contact with the outside cam-track 45 insuring the constant and continuous rotational direction of the cam-roller assemblies 18 during operation. Clearance is provided between the cam-roller assemblies 18 and the inside cam-track 46 to insure that no contact is made during normal running operation. It should be noted that contact with the inside cam-track 46 by the cam-roller assemblies 18 is only made for a brief period during start-up and during shut-down of the engine/generator. In this view we can see that the lower main radial bearing 7 has been removed from the areas within the cylinders 14 for increased clarity as mentioned before.

Looking now at the operation of the stationary block engine/generator as seen in FIG. 7 and FIG. 7A, the position of the piston assemblies 39 can be seen in the two opposing cylinders 14A. The piston assemblies 39 are located at the top of their stroke, the exhaust valve stems 21 are closed in the valve assemblies 20, fuel has been injected into the two combustion chambers 60 related to the cylinders 14A, the cam-track/armature assembly 75 is in a rotational position such that the spark conductors 8, used to advance the spark to the piston assembly 39 and ultimately to the spark plug heads 38 seen in FIG. 1A and FIG. 1B, are in alignment with the spark plugs 3. A high energy spark is jumped from the spark plugs 3 to the spark conductors 8 and again to the piston assembly 39 causing an ignition spark at the spark plug head 38 in the combustion chamber 60. As the rotational direction of the cam-track/armature assembly 75 in the preferred embodiment is clockwise the pressure exerted on the piston assembly 39 by the combustion of fuel in the combustion chambers is translated to the cam-roller assemblies 18 which are in constant and continuous contact with the outside cam-track 45, and that this rotational movement of the cam-track/armature assembly 75 with its included outside cam-tracks 45 and the inside cam-tracks 46 will bring the two angular descending surfaces 45A into contact with the pressurized cam-roller assemblies 18 causing rotation of the cam-track/armature assembly 75 and further causing the production of electricity through the interaction of the magnets in the cam-track/armature assembly 75 and the stationary electrical coil 32.

FIG. 8 and FIG. 8A are quite similar to FIGS. 7 and 7A except that in these views the cam-track/armature assembly 75, with the included cam tracks 45 and 46, has been rotated in a clockwise direction (a total of 32.5 degrees from FIGS. 7 and 7A) as a direct result of the combustion event seen in FIGS. 7 and 7A. The piston assemblies 39 are now at the bottom of their stroke and the exhaust valve stems 21 are fully opened as a result of the interaction of the exhaust valve cam 25, of the exhaust valve assemblies 20, with the raised cam-lands 47, of the exhaust valve actuating cam-ring 30. The combustion event is now complete and exhaust is allowed to leave the cylinders 14A through the opened exhaust valve stems 21 and out the exhaust pipe 26 by way of the exhaust ports 62 in the stationary engine block 13. As there is no movement of the piston assemblies 39 at this time there is no combustion energy lost during the exhaust cycle of the stationary block engine/generator, as in conventional engines where the piston immediately moves inward, back to the top of the piston stroke, forcing exhaust gasses out of the cylinders at great pressure and consequently great inefficiency and loss of usable energy.

The next event in the operation of the stationary block engine/generator is the cylinder purge and cooling cycle, which is again accomplished with relatively no movement of the piston assemblies 39, greatly increasing the amount of usable energy produced during the combustion event. Once the cylinders 14A are decompressed because of the open exhaust valve stems 21, cylinder purge and cooling air is allowed to enter the cylinders under pressure by way of one or more ancillary valves (preferably an ancillary rotary valve, although any conventional valve is acceptable) not seen but preferably operated by the ring gear 5. The ancillary air valve/valves may also be operated/actuated by any other conventional means. The cylinder purge and cooling air enters the cylinders by way of the threaded port 57 in the top case half 4, to the relief groove 58 that surrounds the cylinders 14A, and is directed into the cylinders through the air intake port 71 (FIG. 8A) which is located in the outside diameter wall of the cylinders 14A and into the cylinders at the air purge port 72 (FIG. 8A) which is located in the inside diameter wall of the cylinders 14A and now exposed to the internal cylinder by the fully extended position of the piston assembly 39. The purge and cooling air circulates through the entire length of the cylinders and combustion chambers escaping through the still open exhaust valve stems 21, cooling the cylinders, combustion chambers, exhaust valves, the exhaust valve assemblies, the stationary block and the exhaust pipe. This process insures that spent gases in the cylinders and combustion chambers from the previous combustion are removed prior to the next combustion, improving the new combustion efficiency, increasing combustion energy and reducing pollution while increasing overall efficiency and usable energy production. There is another positive result experienced because of this purge and cooling event. Because the entire usable lengths of the cylinders 14 are cooled internally, their internal surface temperatures are lower when the new fresh combustion air is finally introduced to the cylinder. Because the internal surface temperatures of the cylinders are cooler, there is less pre-expansion of the air in the cylinder prior to combustion, allowing greater expansion of those gases during and after the combustion event. This means greater energy production from the combustion event as a result of greater expansion of the gases within the cylinders after combustion, which in turn produces higher cylinder pressures, which are then exerted on the piston assembly 39 thereby producing more power per combustion event and more usable output energy, and therefore greater overall efficiency and lower fuel consumption.

This purge and cooling event is not effectively possible in a conventional engine because there is no substantial amount of time for which the reciprocating pistons are in a fully extended, relatively stationary position. With the present invention, because the pistons may remain at or near a fully extended position, following each combustion event, for a much longer amount of time, this allows an opportunity for air to be introduced into the cylinders through the air purge ports to cool and evacuate the cylinders.

FIG. 9 and FIG. 9A are quite similar to FIGS. 8 and 8A except that in these views the cam-track/armature assembly 75, with the included cam tracks 45 and 46, has been rotated still farther in a clockwise direction (a total of 90 degrees from FIGS. 7 and 7A), as a direct result of the combustion event seen in FIGS. 7 and 7A. At this point the cylinder purge and cooling cycle is still in progress. Before the cylinder purge and cooling cycle has been completed the entire volume of air in the cylinders 14A will have been replaced several times insuring a cool and clean environment to maximize the next combustion event. The exhaust valve stem 21 is still open in these views, and it will remain open until shortly before the next compression cycle when the piston assembly 39 begins to move slowly inward due to the interaction of the cam roller assemblies 18 and the gradually increasing camming angle of the outer cam-track 45 as seen at 45B. This slower acceleration of the piston assembly will again conserve energy which can then be converted into usable output energy by the generator portion of the engine/generator assembly, further increasing overall efficiency.

In FIGS. 9 and 9A, the cylinders 14B are now in the same ignition position that the cylinders 14A were in, in FIGS. 7 and 7A. The cylinders 14A of FIGS. 9 and 9A are still in the purge and cooling cycle with the exhaust valve stems 21 still open. The exhaust valve stems 21 will remain open for another 24.6 degrees of clockwise rotation of the cam-track/armature assembly 75 and the cylinder purge and cooling cycle will continue for another 35.6 degrees of rotation of the cam-track/armature assembly 75. In this preferred embodiment the exhaust valve stem 21 closes 11 degrees prior to the end of the purge/cooling cycle. This configuration therefore allows the cylinders to be pre-pressurized by the purge/cooling air prior to the inward movement of the piston assembly 39 which is caused by the interaction of the cam roller assemblies 18 and the outer cam-track 45. This action will provide for greater cylinder pressures prior to combustion. If it is determined that lower cylinder pressures are desirable prior to combustion, the timing of the valve stems 21 closure can be simply adjusted to occur after the purge/cooling cycle is complete, reducing pre-compression cylinder pressures. The valve stem closure can be further delayed so as not to occur until after partial assent of the piston assembly 39 on the outer cam-track 45 during the compression cycle, further reducing internal cylinder pressures prior to combustion if so desired.

As noted above, the cylinders 14B are now in the same ignition position that the cylinders 14A were in, in FIGS. 7 and 7A. The cam-track/armature assembly 75 of the stationary block engine/generator has only rotated 90 degrees since the last combustion event where two opposing cylinders and combustion chambers experienced combustion. It should also be clear that each cylinder has a combustion event once in the course each 180 degree rotation and therefore twice in the course of one complete 360 degree rotation. The four cylinder stationary block engine/generator as shown will therefore produce eight complete combustion events in the course of one 360 degree rotation.

While the preceding preferred embodiments are described and depicted to show each of the cylinders 14 extending radially outward from the center, it is possible to configure the cylinders in may different ways.

Figure 11:
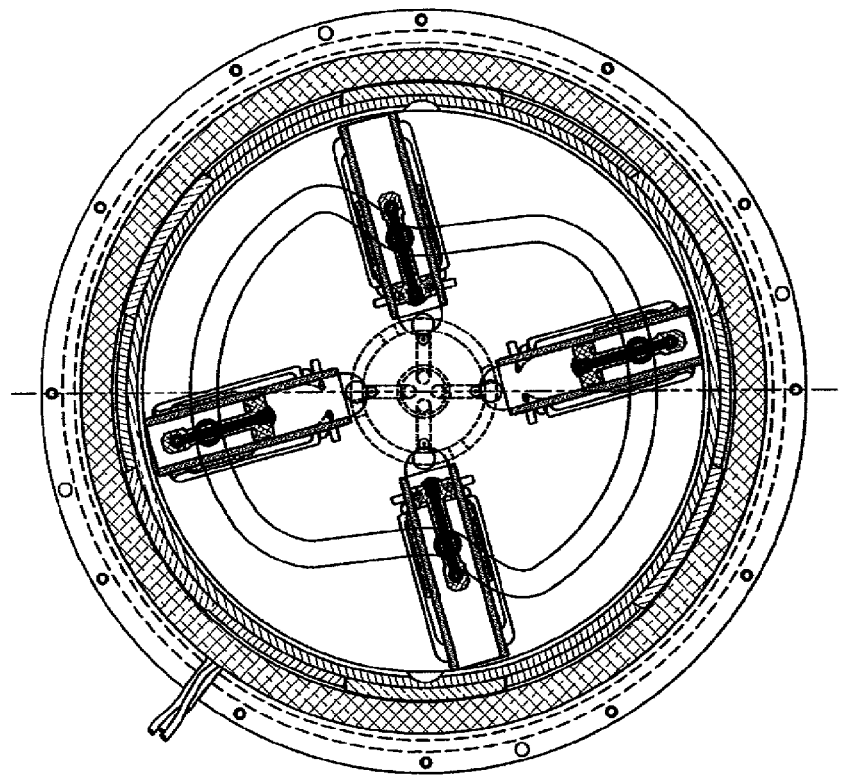
FIGS. 10 and 11 are top cross sectional views each showing another embodiment similar to those shown in FIGS. 6, 7, 8 and 9, except that the direction in which the cylinders extend radically outward is slightly offset.
Figure 10:
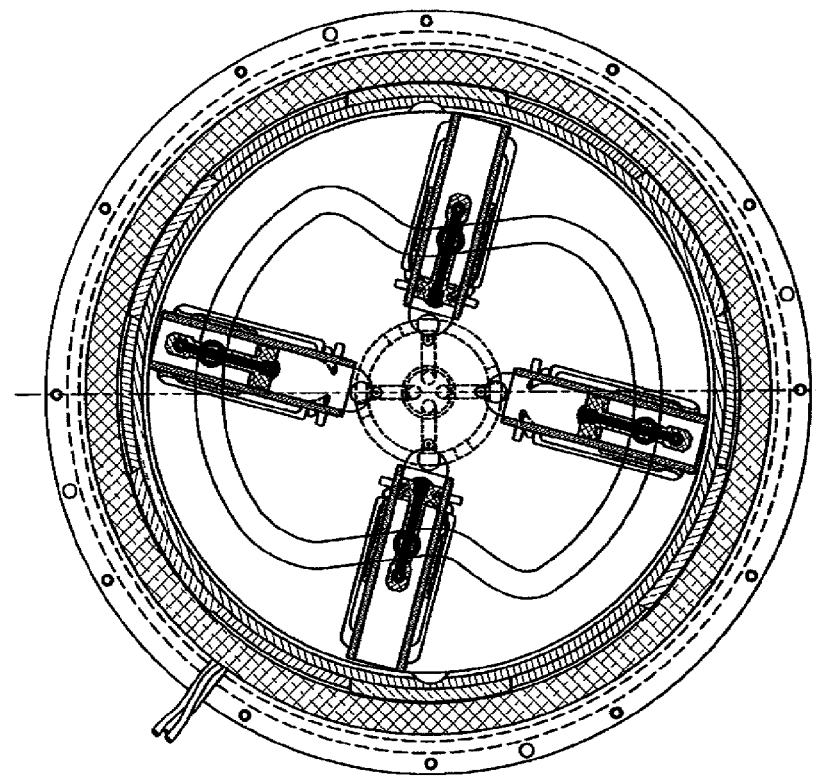

FIGS. 10 and 11 are a top cross-sectional view, each showing another variation of the cylinder arrangement. Reference numerals have been omitted for clarity, but the elements in each figure may be readily identified by any of the preceding FIGS. 6, 7, 8 and 9. FIGS. 10 and 11 each show an embodiment in which the orientation of the cylinders has been offset slightly, either to the left or right, from extending directly radially outward from the center.

Figure 13:
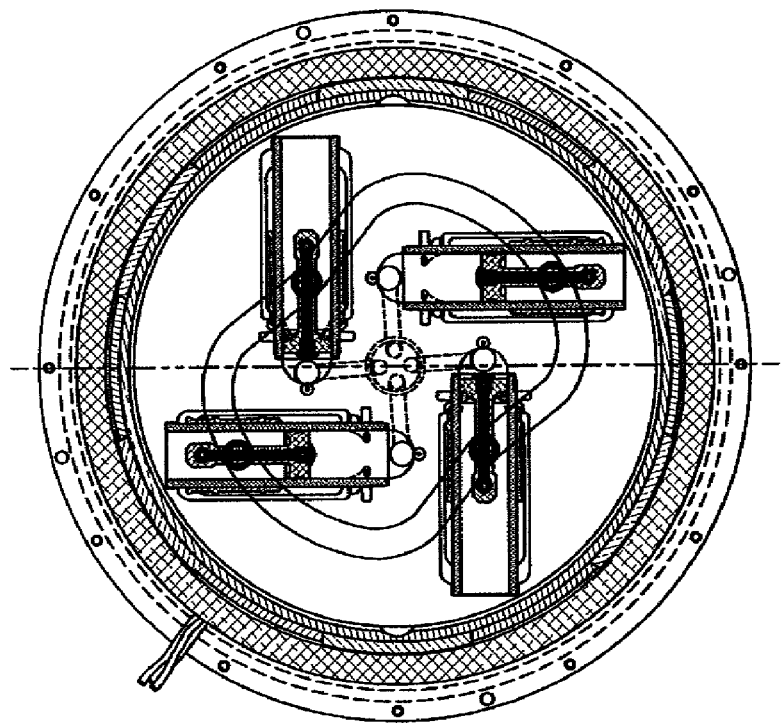
FIGS. 12 and 13 are top cross sectional views each showing another embodiment in which the cylinders are offset 90° to a radially outward direction from the center.
Figure 12:
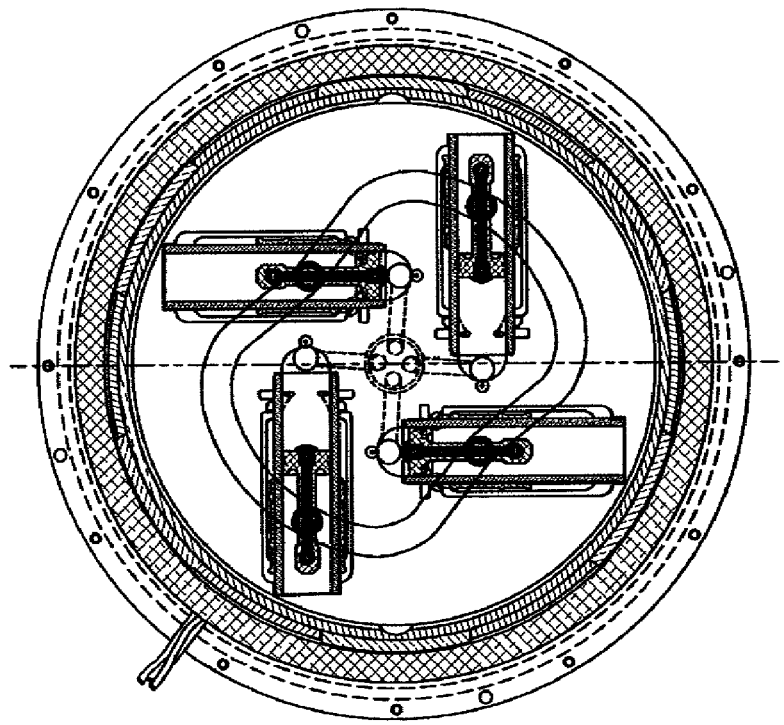

FIGS. 12 and 13 each depict a top cross-sectional view in which the cylinder arrangement is even further offset to extend 90° from a radially outward direction from the center. As can be seen in these figures, such an offset arrangement results in an even more compact design which may be desirable for certain applications. The offset cylinder configuration while being more compact will however increase the loads placed on components of the engine during operation.

A combination of cylinder arrangements and multiple cam-tracks in a single cam-track plate is also possible, but not depicted.

It will be recognized that the foregoing explanation associated with FIGS. 1-9A have followed the events occurring in one quarter (90 degrees) of one revolution of the cam-track/armature assembly 75 of the stationary block engine/generator. It is to be recognized by one familiar with the interior workings of a typical engine that the herein disclosed engine and generator combination of the stationary block engine/generator represents a great leap forward in the search for an extremely power dense, lightweight, economical, dependable and reliable source of electrical power, contained in an extremely small package, that is useful for virtually any and all portable, as well as stationary applications. It is also to be recognized that the herein disclosed engine of the stationary block engine/generator is capable of operating using any single fuel or combination of liquid and/or gaseous fuels commonly used in the operation of internal combustion engines. It should also be recognized that, due to the increased power density and overall efficiency, the herein disclosed engine of the stationary block engine/generator is capable of operating on lower grade fuels than are commonly used in the operation of standard internal combustion engines.

Having described this invention, it is believed that from the foregoing those skilled in the art will readily recognize and appreciate the novel advancement represented by this invention and will understand that the embodiment hereinabove described and illustrated in the accompanying drawings, while being preferred, is susceptible to modification, variation and substitution of equivalents without departing from the spirit and scope of the invention, which is intended to be unlimited by the foregoing, except as may appear in the following appended claims.

The invention claimed is:

1. An engine and generator apparatus comprising:
a stationary engine block having at least one cylinder;
a piston moveable coaxially within each of said at least one cylinder;
at least one cam follower associated with each piston;
at least one rotatable cam plate;
at least one generator armature coupled to the cam plate and rotatable with the cam plate, the generator armature having at least one of a magnetic or electromagnetic mass;
an endless cam track formed within the cam plate, the at least one cam follower being operationally engaged with said cam track; and
a stationary housing encasing a stationary electrical coil, said stationary engine block, said at least one rotatable cam plate, and said at least one generator armature;
wherein combustion actuation of each piston serves to rotatably drive said at least one cam plate, and said at least one generator armature within the stationary housing such that the at least one of the magnetic or electromagnetic mass moves past the stationary electrical coil in an orbital movement about the stationary engine block to produce an electrical energy output.

2. An apparatus according to claim 1, wherein the at least one cylinder extends radially outward from an axis of rotation of the at least one cam plate.

3. An apparatus according to claim 1, wherein the at least one cylinder is offset such that a longitudinal axis of the at least one cylinder does not intersect with an axis of rotation of the at least one cam plate.

4. An apparatus according to claim 1, wherein the engine block is disposed between two cam plates and encircled by the at least one generator armature, and the two cam plates are separately operationally engaged with two cam followers associated with each piston.

5. An apparatus according to claim 1, wherein said at least one rotatable cam plate is supported by a ball/roller bearings.

6. An apparatus according to claim 1, wherein at least one cooling fluid pathway is provided between the stationary housing and the stationary electric coil.

7. An apparatus according to claim 1, further comprising an electro/magnetic actuated exhaust valve, and a computer processor that controls the actuation of the exhaust valve.

8. An apparatus according to claim 1, wherein multiple combustion events are achieved within each cylinder in the course of a single revolution of the cam plate.

9. An apparatus according to claim 1, wherein multiple cooling fluid pathways are provided in the stationary block to provide engine cooling.

10. An apparatus according to claim 1, further comprising a plurality of the at least one of the magnetic or electromagnetic mass on the generator armature.

11. An apparatus according to claim 1, wherein multiple cylinders and pistons are provided.

12. An apparatus according to claim 11, wherein the cylinders are arcuately spaced apart.

13. An apparatus according to claim 1, further comprising a ring gear mounted on said at least one cam plate.

14. An apparatus according to claim 13, further comprising:
a ring gear mounted on said at least one cam plate; and
outputting mechanical power from the ring gear.

15. An apparatus according to claim 1, further comprising at least one air purge port, wherein the air purge port is exposed to said at least one cylinder only when said piston is at or near a fully extended position.

16. An apparatus according to claim 15, wherein the at least one air purge port is located near an end of said at least one cylinder opposite an end at which an exhaust valve is located.

17. An apparatus according to claim 15, wherein the at least one air purge port is located near an end of said at least one cylinder opposite an end at which an exhaust valve is located.

18. An apparatus according to claim 15, wherein said at least one piston is provided with means for slowing or stopping the piston's linear motion at the near or fully extended position within the said cylinder to provide extended purge and cooling effects from the communication of the air purge port into the cylinder.

19. An apparatus according to claim 15, wherein the at lease one air purge port remains in communication with the cylinder after the exhaust valve closes so as to provide pre-compression of the cylinder prior to the inward movement of the piston.

20. A method of generating power comprising the steps of:
providing an engine comprising:
a stationary engine block having at least one cylinder;
a piston moveable coaxially within each of said at least one cylinder;

at least one cam follower associated with each piston;

at least one rotatable cam plate;

at least one generator armature coupled to the cam plate and rotatable with the cam plate the generator armature having at least one of a magnetic or electromagnetic mass;

an endless cam track formed within the cam plate, the at least one cam follower being operationally engaged with said cam track; and a stationary housing encasing a stationary electrical coil, said stationary engine block, said at least one rotatable cam plate, and said at least one generator armature; and rotatably driving said at least one cam plate, and said at least one generator armature within the stationary housing by combustion actuation of each piston such that the at least one of the magnetic or electromagnetic mass moves past the stationary electrical coil in an orbital movement about the stationary engine block to produce an electrical energy output.

21. A method according to claim 20, further comprising the steps of:

providing a ring gear mounted on said at least one cam plate; and outputting mechanical power from the ring gear.

22. A method according to claim 20, further comprising the steps of:

providing an electro/magnetic actuated exhaust valve; and providing a computer processor that controls the actuation of the exhaust valve.

23. A method according to claim 22, further comprising the steps of:

varying the timing of the exhaust valve based upon an input to the computer processor.

24. A method according to claim 23, wherein the step of varying the timing of the exhaust valve is based upon at least one of a fuel type input, an engine load input, a combustion sensor feedback input or an exhaust sensor feedback input.

25. A method according to claim 23, further comprising the step of introducing varying types of fuels into said at least one cylinder for said combustion actuation of said piston, and wherein the varying of the timing of the exhaust valve is at least partially based upon the type of fuel being introduced into said at least one cylinder.

* * * * *